US011293797B2

(12) United States Patent
Ketchum et al.

(10) Patent No.: US 11,293,797 B2
(45) Date of Patent: Apr. 5, 2022

(54) LIQUID PRODUCT DISPENSING SYSTEM

(71) Applicant: Fronhofer Design LLC, Cossayuna, NY (US)

(72) Inventors: Benjamin Ketchum, Moreau, NY (US); Paul Fronhofer, Salem, NY (US)

(73) Assignee: Fronhofer Design LLC, Cossayuna, NY (US)

( * ) Notice: Subject to any disclaimer, the term of this patent is extended or adjusted under 35 U.S.C. 154(b) by 56 days.

(21) Appl. No.: 17/075,042

(22) Filed: Oct. 20, 2020

(65) Prior Publication Data

US 2021/0033448 A1 Feb. 4, 2021

Related U.S. Application Data

(63) Continuation-in-part of application No. 16/165,403, filed on Oct. 19, 2018, now Pat. No. 10,815,110.

(60) Provisional application No. 62/663,571, filed on Apr. 27, 2018.

(51) Int. Cl.
*B67C 3/20* (2006.01)
*G01G 15/00* (2006.01)
*G01G 17/06* (2006.01)

(52) U.S. Cl.
CPC .......... *G01G 15/006* (2013.01); *B67C 3/202* (2013.01); *G01G 17/06* (2013.01); *G01G 2015/007* (2013.01)

(58) Field of Classification Search
CPC ...... B67C 3/202; G01G 15/006; G01G 17/06; G01G 2015/2657
USPC ............................................................ 141/83
See application file for complete search history.

(56) References Cited

U.S. PATENT DOCUMENTS

| 4,582,102 | A | ‡ | 4/1986 | Risser | B67C 3/202 141/144 |
| 6,220,312 | B1 | * | 4/2001 | Hirsch | G01G 3/125 177/52 |
| 6,644,344 | B2 | * | 11/2003 | Tibbott | G01G 1/243 137/391 |
| 2013/0146178 | A1 | * | 6/2013 | Graffin | G01G 23/12 141/83 |

FOREIGN PATENT DOCUMENTS

DE 3740876 A1 ‡ 6/1989 ............ B67C 3/202

* cited by examiner
‡ imported from a related application

*Primary Examiner* — Jason K Niesz
(74) *Attorney, Agent, or Firm* — Hunter E. Webb; Keohane & D'Alessandro, PLLC

(57) ABSTRACT

Disclosed embodiments provide a liquid product dispensing system. Cans are transported onto a weigh plate. The weigh plate is coupled to a dispensing system such that, when the can is filled with product to a predetermined weight, the dispensing system stops the flow of product into the can. A transport system then moves the filled cans from the weigh plate and moves another set of empty cans onto the weigh plate, and the process continues, enabling high-speed production of canned beverages.

21 Claims, 43 Drawing Sheets

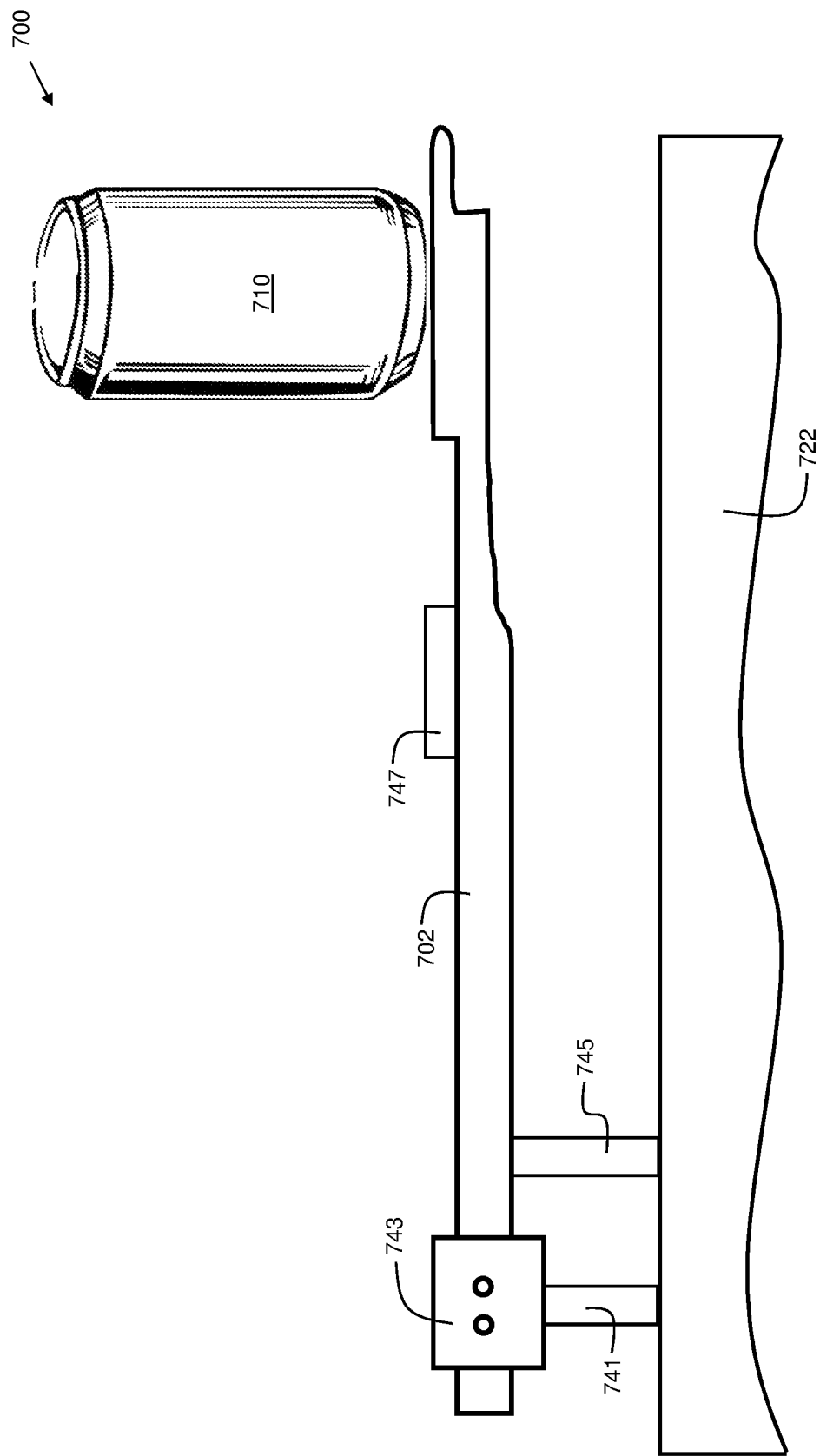

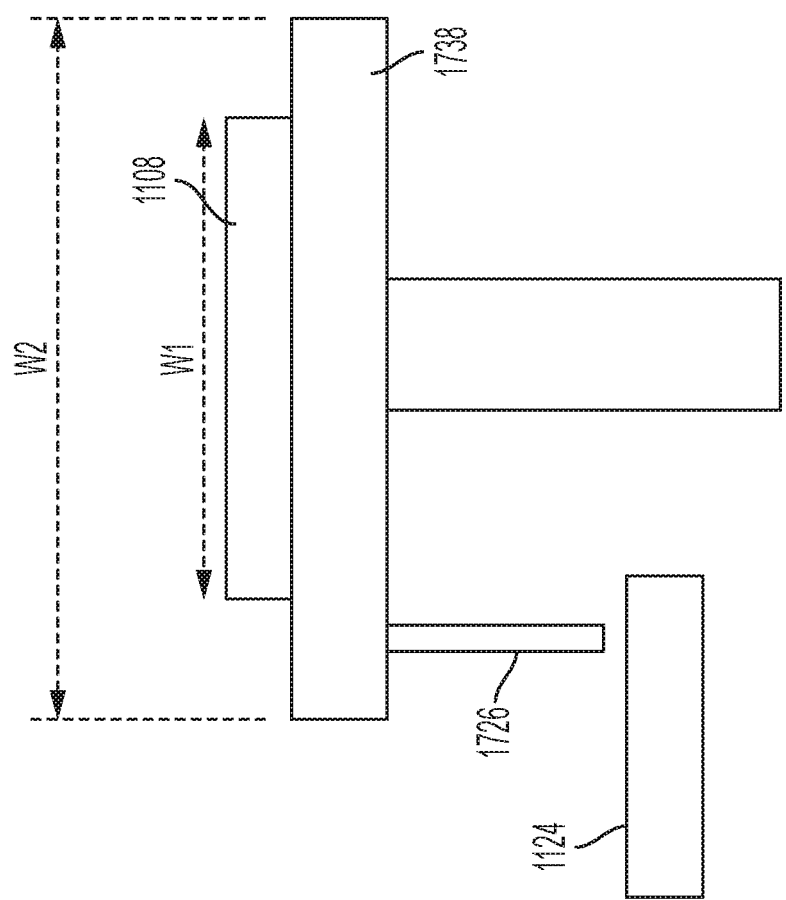

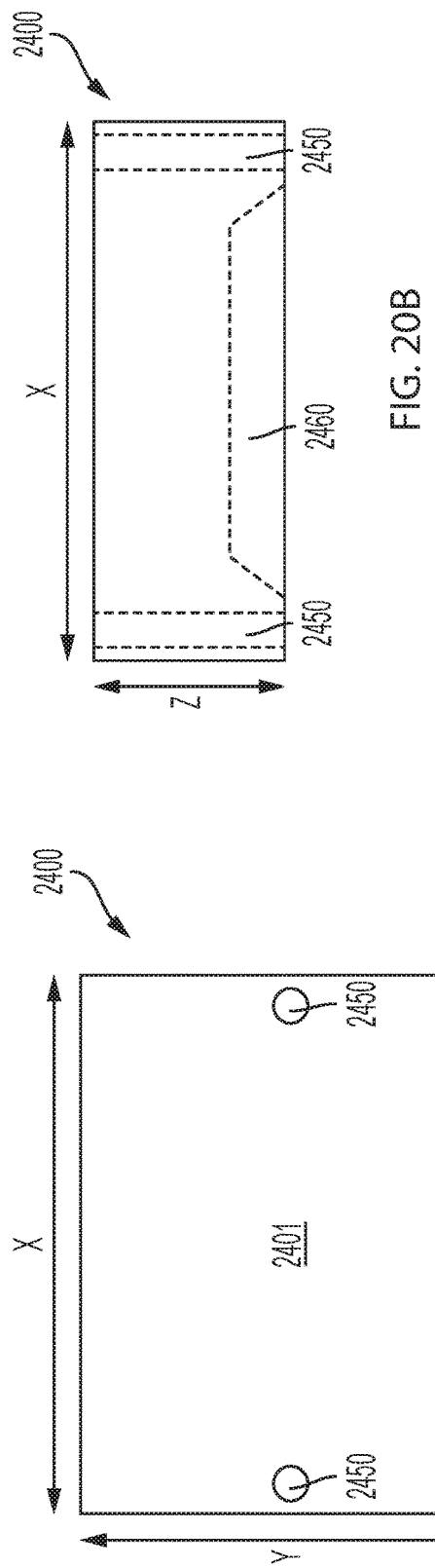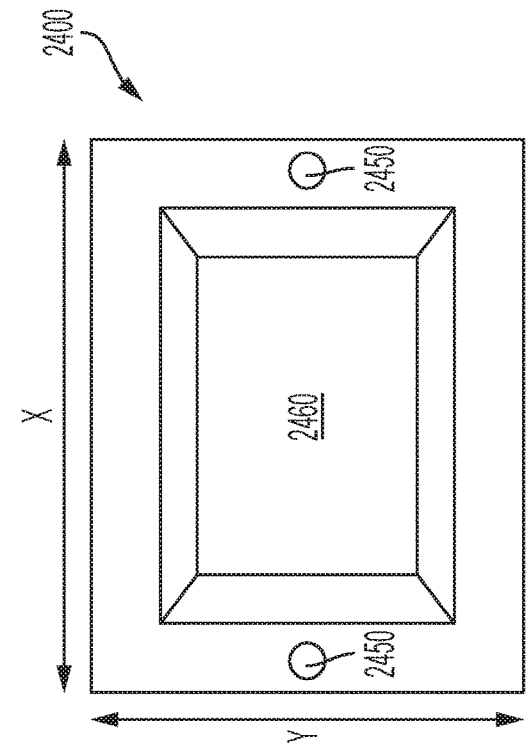

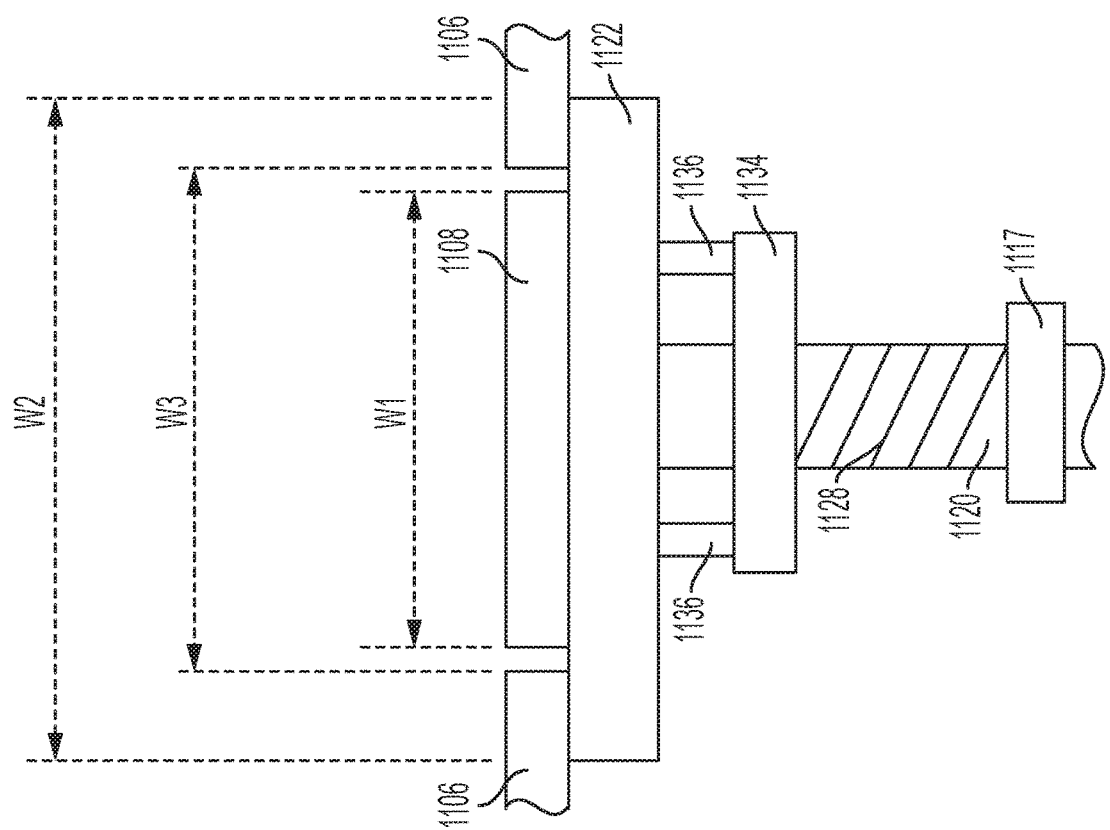

LIQUID PRODUCT DISPENSING SYSTEM

CROSS REFERENCE TO RELATED APPLICATIONS

This application is a continuation-in-part, and claims the benefit of and priority to U.S. Patent Application Ser. No. 62/663,571, filed on Apr. 27, 2018, which claims priority to U.S. patent application Ser. No. 16/165,403, filed on Oct. 19, 2018. The entire contents of such applications are incorporated herein by reference.

FIELD OF THE INVENTION

The present invention relates generally to liquid product dispensing systems, and more particularly, to liquid product dispensing systems for beverage containers.

BACKGROUND

The process of beer making requires adherence to strict standards in order to create a quality beer with uniform consistency and flavor from can to can. Beer production typically includes the steps of brewing, fermentation, and clarification. The finished product is placed into cans or bottles for distribution and consumption. In addition to beer, soft drinks and other beverages are also distributed in bottles and cans. Soft drinks include all drinks made from water or mineral water, sodas, and other drinks. The beverages often contain carbon dioxide and/or Nitrogen. Other beverage products such as flavored water, sports and energy drinks, lemonades, fruit punches, and ice teas use a similar manufacturing process. Cans have certain advantages over bottles in certain situations. They block light transmission and are less prone to breakage. Thus, cans continue to be a popular container in which to store beverages. It is therefore desirable to have improvements in beverage canning.

SUMMARY

In one embodiment, there is provided a beverage container weighing apparatus, comprising: a container platform; a weigh plate disposed on the container platform; a compression spring mechanically coupled to the container platform; a stop plate, wherein the stop plate comprises an opening, wherein the opening is wider than the weigh plate, and wherein the container platform is wider than the opening; a weigh plate lockdown actuator configured and disposed to secure the weigh plate against the stop plate; and a sensor configured and disposed to generate a trigger event in response to a predetermined weight being loaded on the weigh plate.

In another embodiment, there is provided a beverage container weighing apparatus, comprising: a container platform; a weigh plate disposed on the container platform; a compression spring mechanically coupled to the container platform; a stop plate, wherein the stop plate comprises an opening, wherein the opening is wider than the weigh plate, and wherein the container platform is wider than the opening; a weigh plate lockdown actuator configured and disposed to secure the weigh plate against the stop plate; and a flange attached to an underside surface of the container platform, wherein the flange is configured and disposed to trigger an optical sensor when a predetermined mass is placed on the weigh plate.

In yet another embodiment, there is provided a beverage container weighing apparatus, comprising: a first container platform; a first weigh plate disposed on the first container platform, wherein the first weigh plate comprises a recessed underside, and wherein a first weight is disposed within the recessed underside of the first weigh plate; a second container platform; a second weigh plate disposed on the second container platform, wherein the second weigh plate comprises a recessed underside, and wherein a second weight is disposed within the recessed underside of the second weigh plate; a first compression spring mechanically coupled to the first container platform; a second compression spring mechanically coupled to the second container platform; a stop plate, wherein the stop plate comprises an opening, wherein the opening is wider than the first weigh plate and wherein the opening is wider than the second weigh plate, and wherein the first container platform is wider than the opening, and wherein the second container platform is wider than the opening; a weigh plate lockdown actuator configured and disposed to secure the first weigh plate and second weigh plate against the stop plate; a first sensor configured and disposed to generate a trigger event in response to a first predetermined weight being loaded on the first weigh plate; and a second sensor configured and disposed to generate a trigger event in response to a second predetermined weight being loaded on the second weigh plate.

In yet another embodiment, there is provided a beverage container weighing apparatus, comprising: a container platform; a weigh plate disposed on the container platform; a compression spring mechanically coupled to the container platform; a stop plate, wherein the stop plate comprises an opening, wherein the opening is wider than the weigh plate, and wherein the container platform is wider than the opening; a weigh plate lockdown actuator operable to press the weigh plate against the stop plate; a processor; an input/output interface coupled to the processor; an optical sensor coupled to an input/output interface; a memory coupled to the processor, wherein the memory contains instructions, that when executed by the processor, perform steps including: activating the weigh plate lockdown actuator; operating a transport mechanism to place a can on the weigh plate; deactivating the weigh plate lockdown actuator; starting product dispensing; in response to detecting a full condition from the optical sensor, ending product dispensing; reactivating the weigh plate lockdown actuator; and operating the transport mechanism to remove the can from the weigh plate.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

FIG. 7 shows details of a liquid product dispensing system in accordance with alternative embodiments of the present invention.

FIG. 17A shows a side view of details of a beverage container weighing apparatus in accordance with additional embodiments utilizing an optical sensor.

FIG. 20A shows a top-down view of a weigh plate in accordance with embodiments of the present invention.

FIG. 20B shows a side view of a weigh plate in accordance with embodiments of the present invention.

FIG. 20C shows a bottom-up view of a weigh plate in accordance with embodiments of the present invention.

FIG. 24A shows a side view of details of a weigh plate locked against the stop plate in accordance with embodiments of the present invention.

DETAILED DESCRIPTION

Figure 1A:
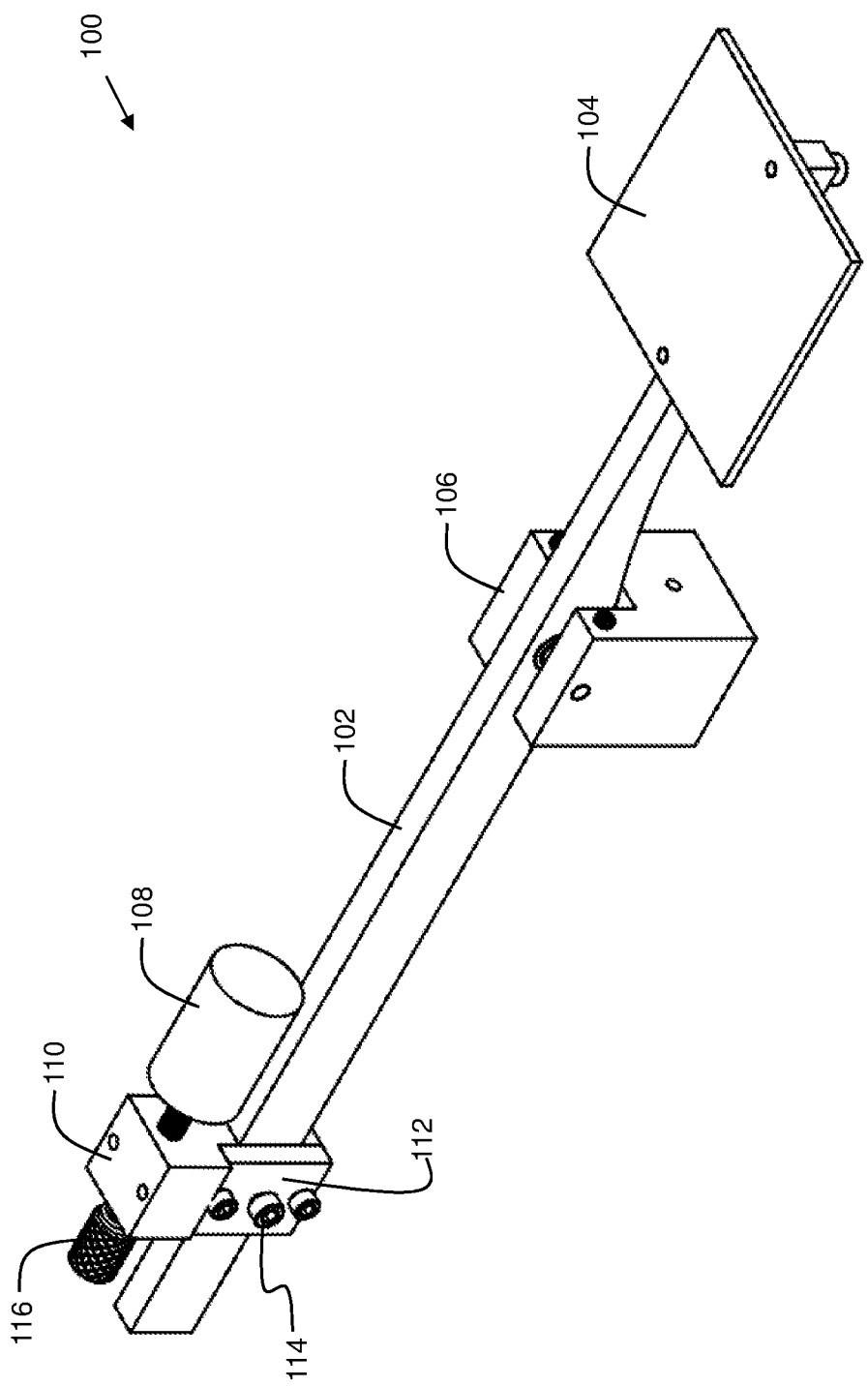
FIG. 1A is a perspective view of a balance apparatus in accordance with embodiments of the present invention.

Disclosed embodiments provide a liquid product dispensing system. Cans are transported onto a weigh plate. The weigh plate is coupled to a dispensing system such that, when the can is filled with product to a predetermined weight, the dispensing system stops the flow of product into the can. A transport system then moves the filled cans from the weigh plate and moves another set of empty cans onto the weigh plate, and the process continues, enabling high-speed production of canned beverages.

Disclosed embodiments provide improvements over mechanisms that use a timed fill cycle for cans. In various production environments, fill pressure is not constant, and often decreases over time. This means that the time required to fill a first can may be less than the time required to fill the thousandth can. When cans are underfilled or overfilled, the product typically is discarded during the quality control process, which adversely impacts product yield. Disclosed embodiments can improve product yield by ensuring the beverage cans are filled to the proper level. With disclosed embodiments, the can is filled to the same level, even if the fill rate varies.

Embodiments include weighing a beverage container to determine when the beverage container has been sufficiently filled for packaging. Disclosed embodiments utilize an individual balance system to maintain a specific weight that is predetermined by the operator. Once the predetermined weight has been reached by dispensing product into the container, the balance trips a sensor to signal the product dispensing to stop.

Embodiments of the invention include a weigh plate on one side of a balance arm, and an adjustable counterweight on an opposite side of the balance arm. A fulcrum block houses bearings that the balance arm actuates on. In embodiments, the counterweight has a dual adjustment, including a coarse adjustment and a fine adjustment. The entire counterweight assembly is slidable along the balance arm and able to be locked into place along the balance arm as a large-scale adjustment mechanism. Embodiments also include a fine thread thumb screw attached to the counterweight cylinder, which acts as a fine adjustment mechanism. Disclosed embodiments can accommodate 8-ounce to 20-ounce beverage containers with varying degrees of densities of the dispensed product. One of ordinary skill in the art could modify embodiments to accommodate other sized beverage containers, and accordingly, all of such are included within the scope of the invention.

In embodiments, as the container reaches the predetermined weight and activates the sensor mounted below, the balance arm activates a sensor coupled to the weigh plate, and the weigh plate comes to a rest on a center stopping block. The center stopping block acts as unified stop for each of the weigh plates as well as a leveling block to ensure that the plates are even and flush with one another when the weigh plate lockdown mechanism is activated.

Embodiments are designed to accommodate two lanes of four beverage containers, split on either side of the stopping block. As four containers are filled on their respective side, and all four sensors are triggered, signaling the end of flow for all fill heads, an actuator locks the weigh plates into place creating a flat plane to enable the beverage containers to exit via a transport mechanism.

Alternative embodiments include the use of wash-down rated electric strain gauges in lieu of the mechanical balance system. In these embodiments, the predetermined weight can be calibrated via a user interface on an electronic display. These embodiments will be further explained in the following detailed description.

Figure 1B:
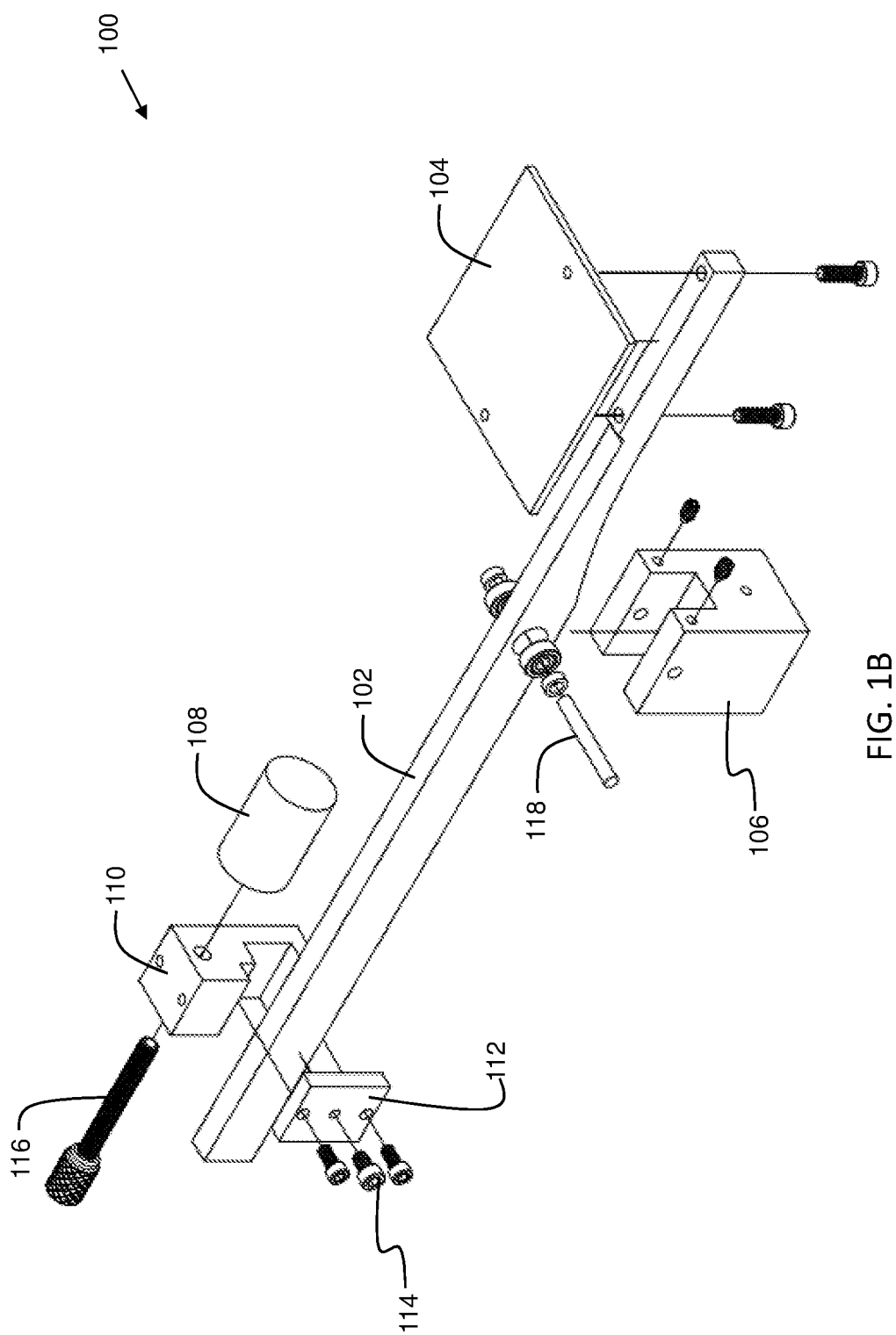
FIG. 1B is an exploded view of a balance apparatus in accordance with embodiments of the present invention.

FIG. 1A is a perspective view of a balance apparatus 100 in accordance with embodiments of the present invention, and FIG. 1B is an exploded view of the balance apparatus of FIG. 1A. Balance apparatus 100 includes a balance arm 102 that is pivotably mounted to fulcrum block 106. The fulcrum block 106 is disposed at an intermediate position on the balance arm 102. A weigh plate 104 is disposed on a distal end of the balance arm 102. A counterweight 108 is disposed on the opposite side of the weigh plate 104, with respect to the fulcrum block 106. In embodiments, the weigh plate 104 has a rectangular top surface 105. In some embodiments, the weigh plate top surface 105 has a surface area ranging from 9 square inches to 16 square inches.

The counterweight 108 is affixed to a counterweight block 110 by adjustment screw 116. The counterweight block 110 is affixed to the balance arm 102 by counterweight block constraint 112 and held in place by set screw 114. A pivot pin 118 (FIG. 1B) traverses the fulcrum block 106 and the balance arm 102 to enable the balance arm to pivot about the fulcrum block. Thus, in embodiments, the counterweight is coupled to a slide block, wherein the slide block is configured and disposed to adjustably attach to the balance arm. Some embodiments include a screw coupled to the counterweight and the slide block, wherein the screw is configured and disposed to adjust the position of the counterweight relative to the fulcrum block. In some embodiments, the screw has a thread count ranging from 20 threads per inch to 40 threads per inch.

As part of a setup procedure, an operator loosens set screw 114 to slide the counterweight block 110 to a position where the balance arm is approximately balanced about the fulcrum block 106 when a full can is placed on weigh plate 104. Fine adjustment can then be achieved by turning adjustment screw 116 to move the counterweight 108 closer to, or further away from, the fulcrum block 106, to ensure that the weigh plate 104 is in its lowest orientation when a full can is placed on the weigh plate 104. This enables a simple, reliable, and cost-effective mechanism for determining when the beverage container (can) is full.

Figure 2A:
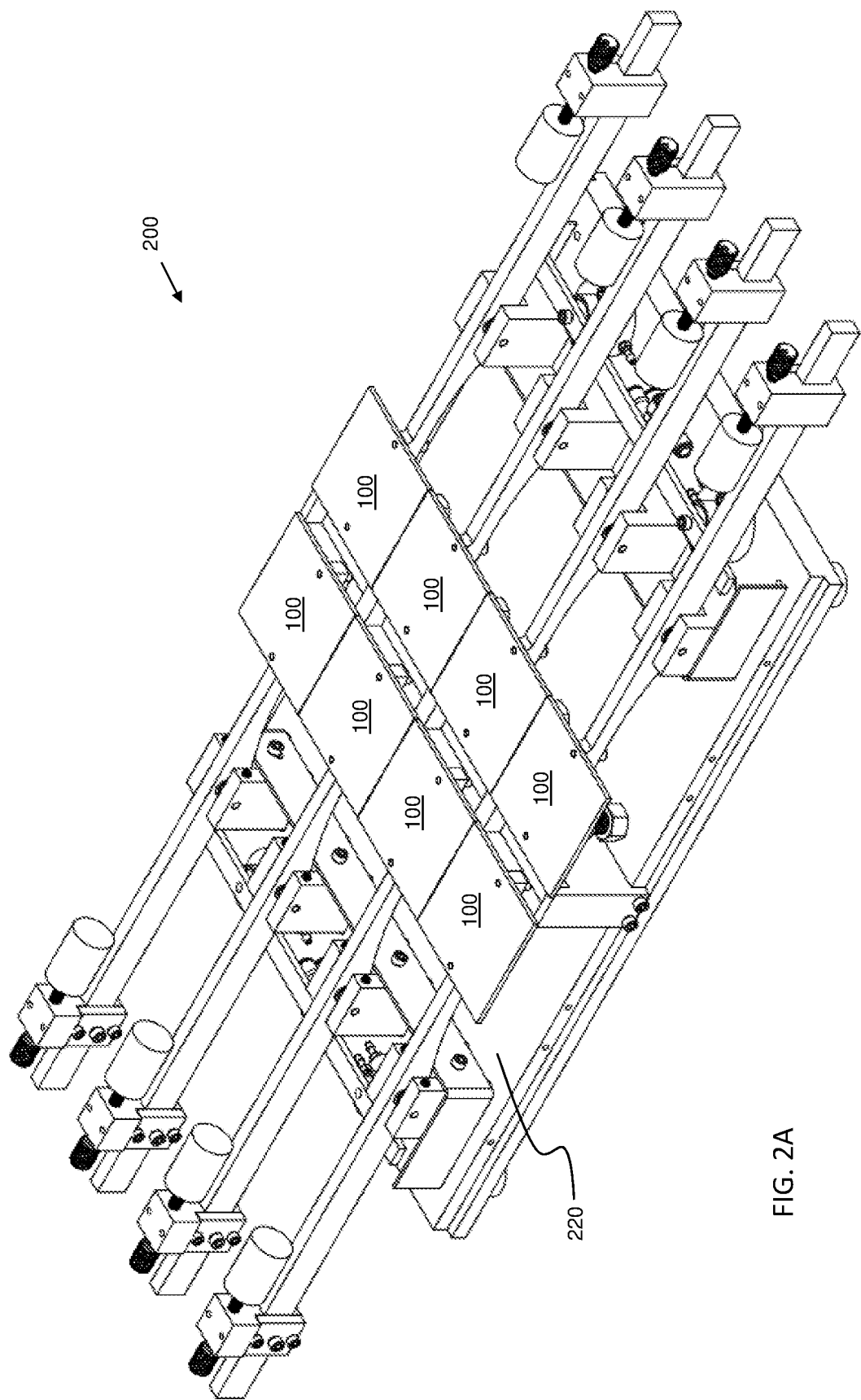
FIG. 2A is a perspective view of a bank of balance apparatuses in accordance with embodiments of the present invention.
Figure 2B:
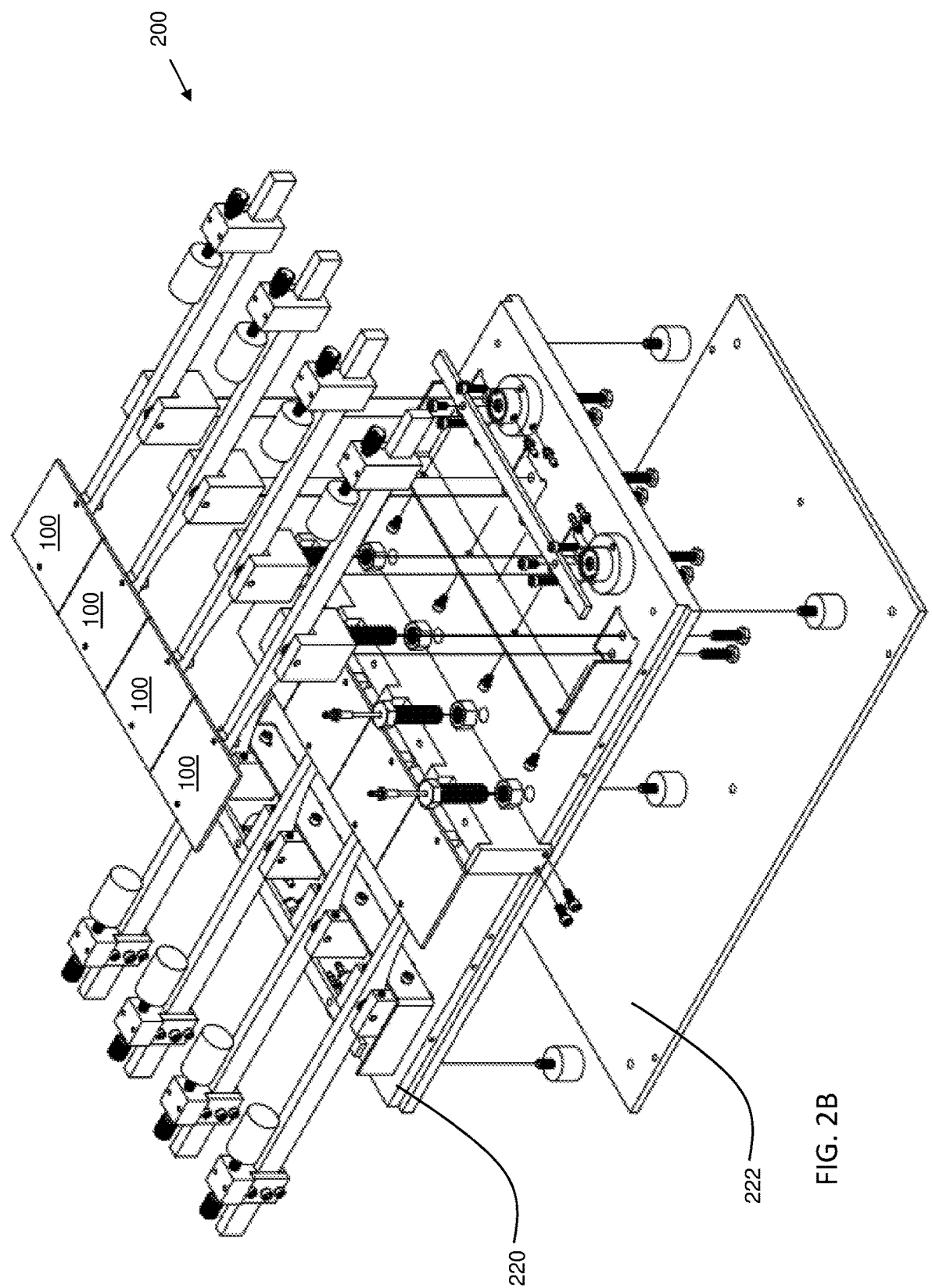
FIG. 2B is an exploded view of a bank of balance apparatuses in accordance with embodiments of the present invention.
Figure 2C:
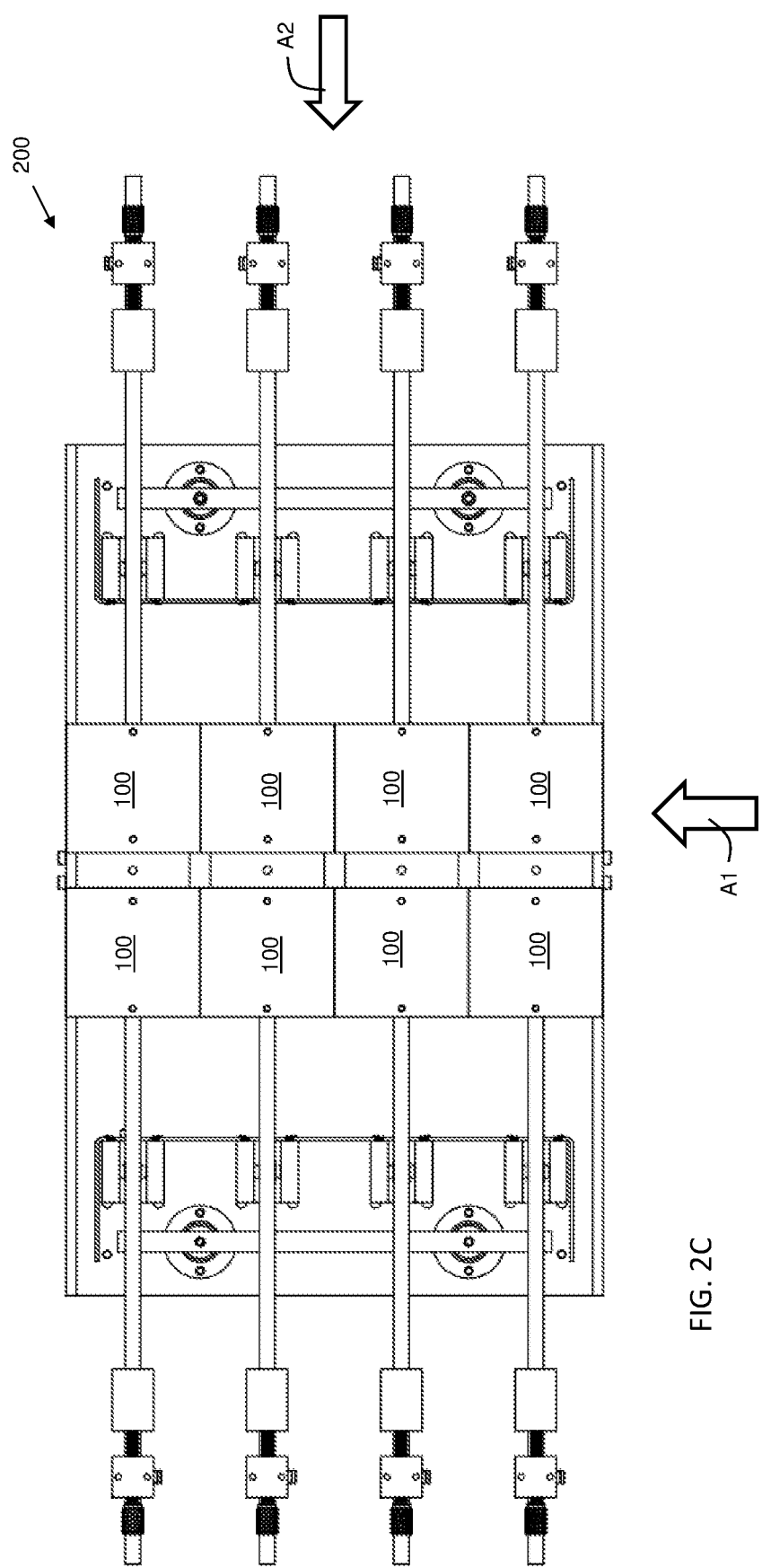
FIG. 2C is a top-down view of a bank of balance apparatuses in accordance with embodiments of the present invention.
Figure 2D:
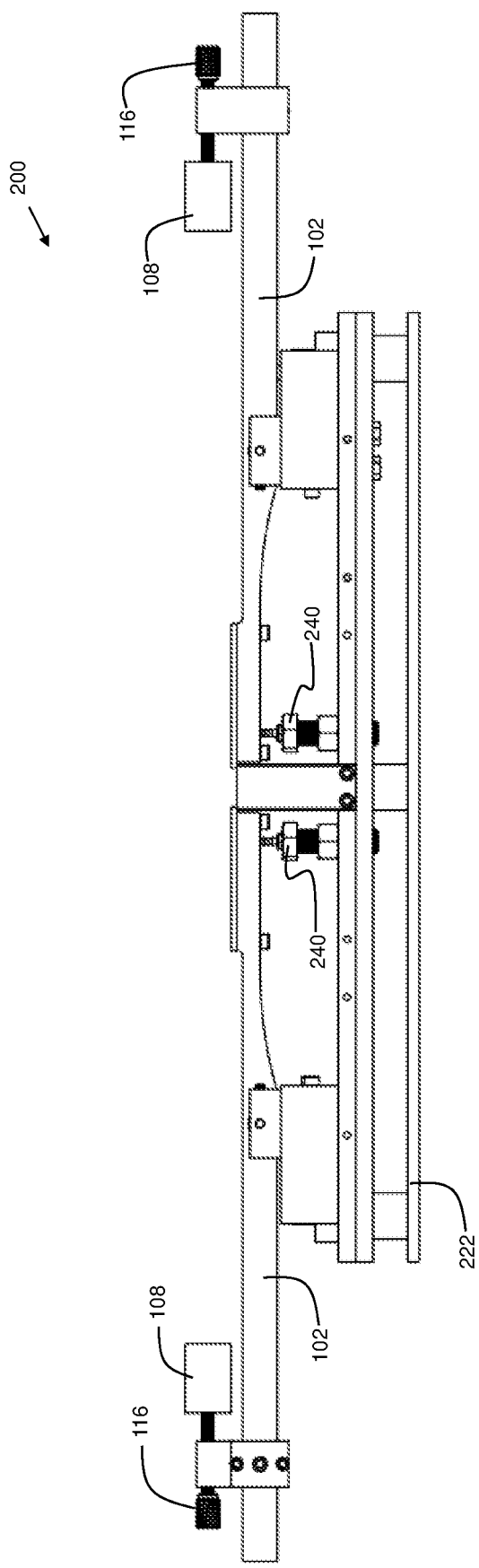
FIG. 2D is a first side view of a bank of balance apparatuses in accordance with embodiments of the present invention.
Figure 2E:
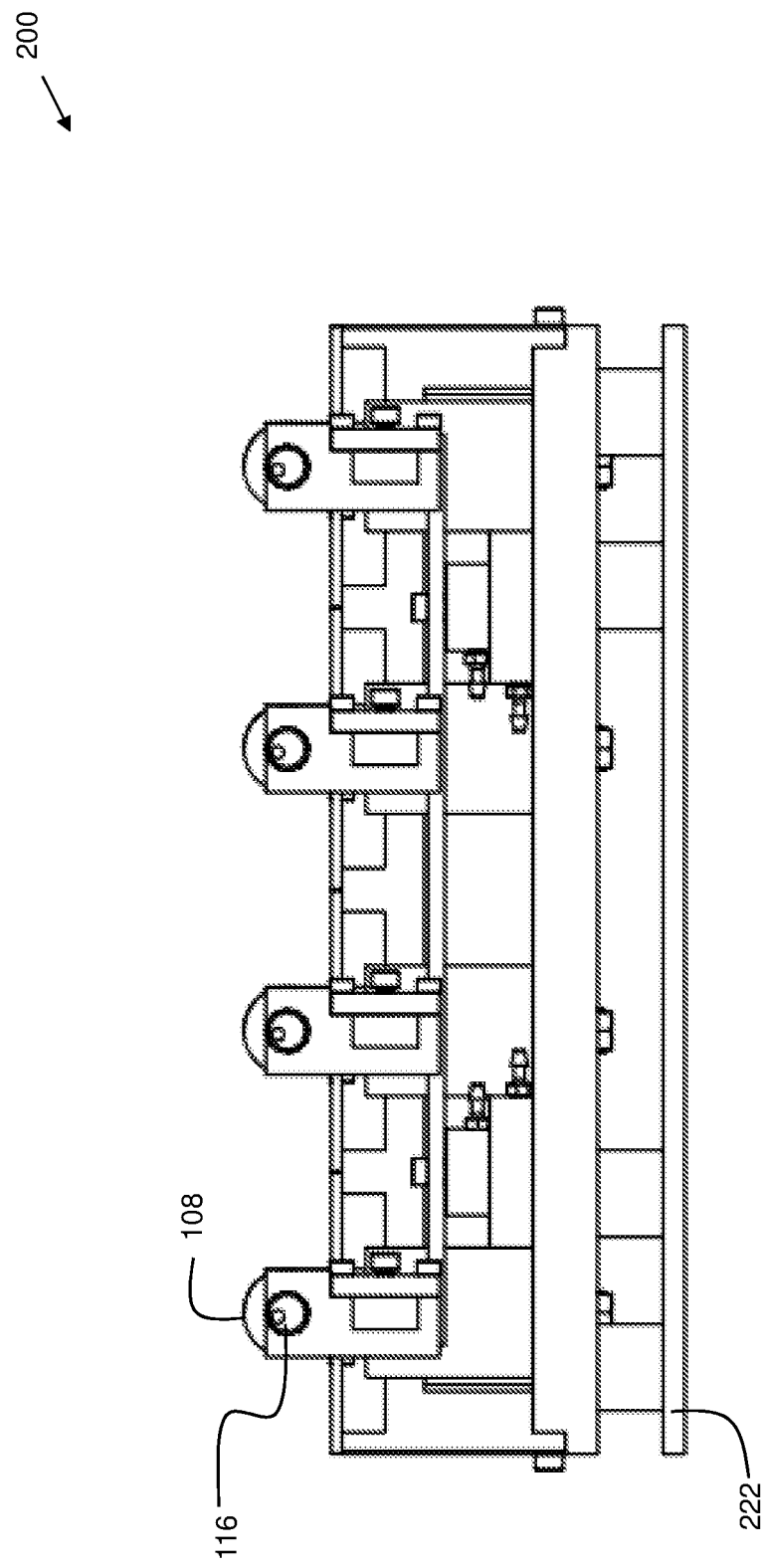
FIG. 2E is a second side view of a bank of balance apparatuses in accordance with embodiments of the present invention.

FIG. 2A is a perspective view of a bank 200 of balance apparatuses in accordance with embodiments of the present invention. FIG. 2B is an exploded view of the bank of FIG. 2A. FIG. 2C is a top-down view of the bank of FIG. 2A. FIG. 2D is a first side view of the bank of FIG. 2A as viewed facing the direction indicated by arrow A1 of FIG. 2C. FIG. 2E is a second side view of the bank of FIG. 2A as viewed facing the direction indicated by arrow A2 of FIG. 2C. As shown in FIGS. 2A-2E, there are 8 balance apparatuses 100 arranged in a 4×2 configuration. The bank of 8 balance apparatuses is mounted on a platform 220, which is mounted on a base 222 (as shown in FIG. 2B). Note that while 8 balance apparatuses are shown in FIGS. 2A-2E, embodiments may have more or fewer than 8 balance apparatuses per bank.

Figure 3:
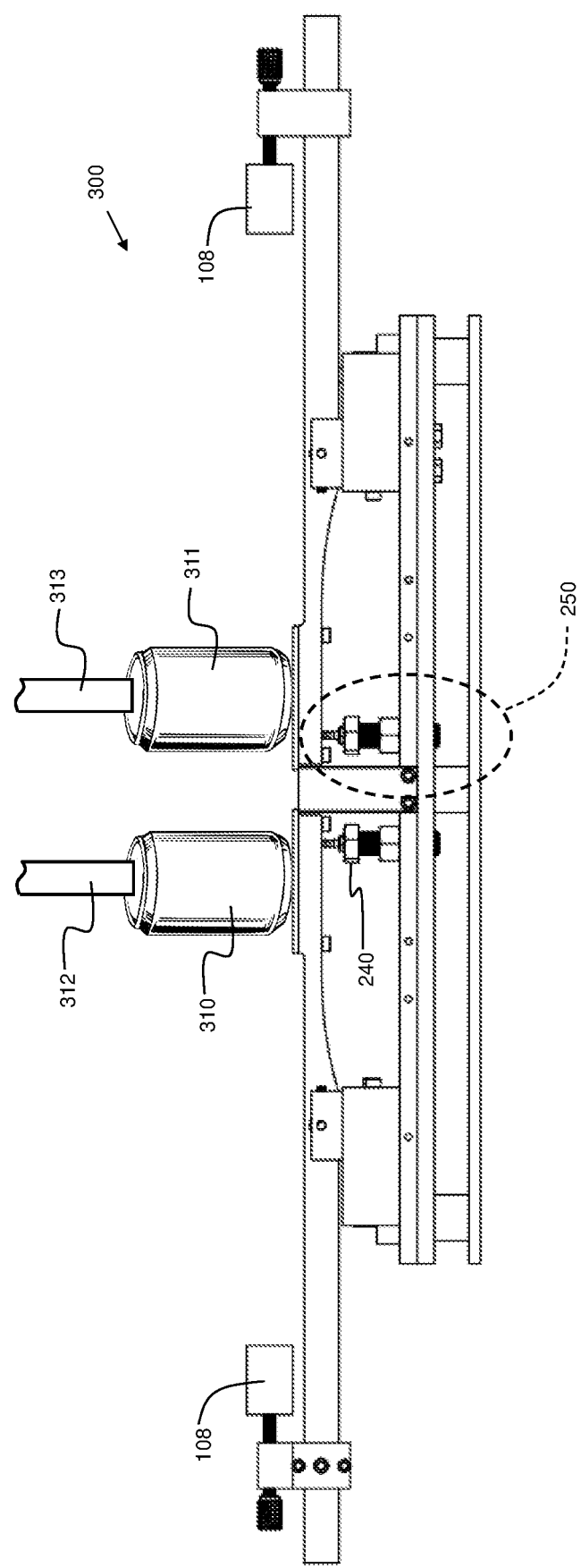
FIG. 3 is a side view of a liquid dispensing system in accordance with embodiments of the present invention.

FIG. 3 is a side view of a liquid dispensing system 300 in accordance with embodiments of the present invention with can 310 and can 311 each disposed on a balance apparatus. A dispensing tube 312 is placed above can 310, and fills can 310 with a product, such as beer, soda, water, tea, or the like. Tube 312 serves as a liquid dispensing port. Similarly, a dispensing tube 313 is placed above can 311, and fills can 311 with a product. When the weight of the dispensed product exceeds the opposing force of the counterweight 108, the sensors 240 are tripped by the balance arm, causing a trigger event. The tripping of the sensors 240 is configured and disposed to generate an electrical signal that causes the dispensing via tubes 312 and 313 to terminate and activate a transport mechanism to move the filled cans 310 and 311 to subsequent stages of the canning process (e.g. sealing, labeling, etc.). Area 250 defines a detail area for the fill sensors. An advantage of this embodiment is that the filling of a particular can is independent of the filling of other cans within the bank. As an example, if can 310 in FIG. 3 completes filling before can 311, then the dispensing is stopped on tube 312 while tube 313 can continue to dispense until can 311 is full. When all the cans within a bank are full, then the transport system can move all the cans off the liquid product dispensing system for further processing.

Figure 4A:
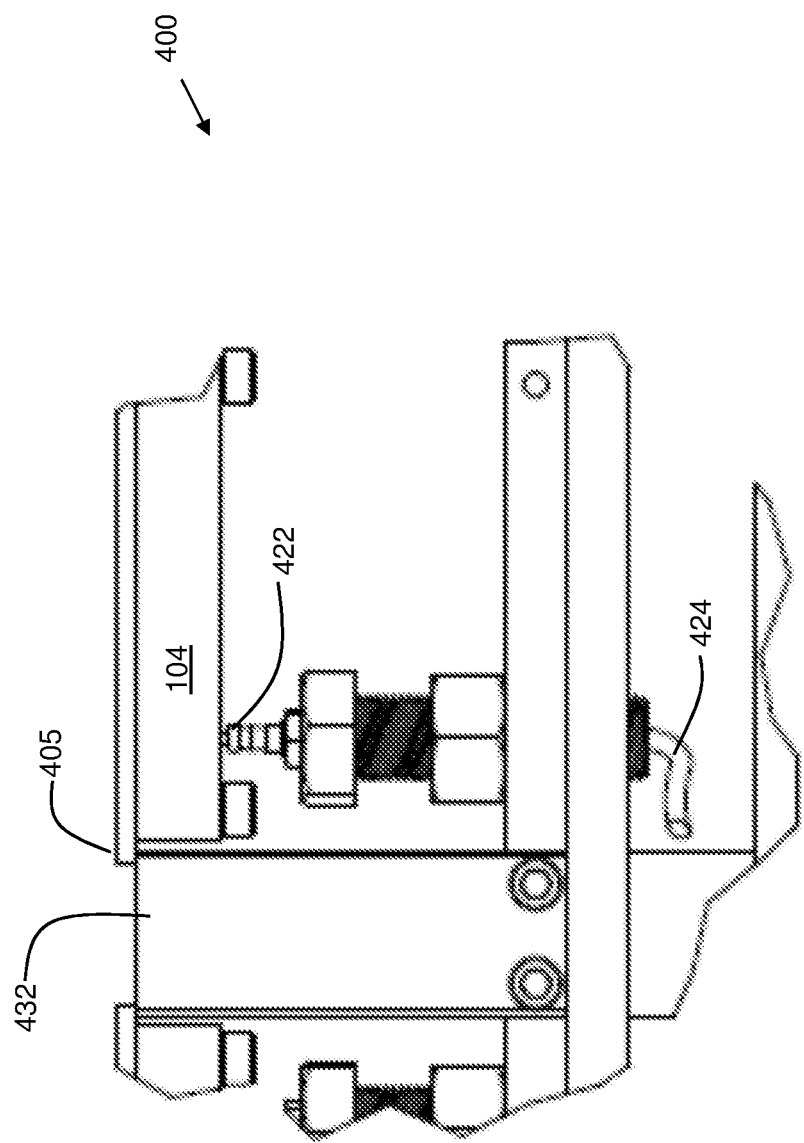
FIG. 4A shows additional detail of a fill sensor in an embodiment of the present invention.

FIG. 4A shows additional detail 400 of a fill sensor in an embodiment of the present invention. FIG. 4A shows details of the area denoted by 250 in FIG. 3. As can be seen in FIG. 4A, a contact sensor 422 is activated when the weigh plate 104 pushes down on the sensor 422 with sufficient force, due to the weight of a filled can. When the contact sensor 422 is activated, an electrical signal is transmitted via wire 424 to a controller, such as a microprocessor, microcontroller, programmable controller, or other suitable processor-based electronic device. Thus, in embodiments, the sensor comprises a contact sensor.

The top surface 405 of weigh plate 104 extends over a stopping block 432 to prevent travel beyond a horizontal orientation. Thus, when the weigh plate 104 is in its lowest position, the stopping block 432 ensures that the top surface 405 (like 105 of FIG. 1A) is in a horizontal orientation. The horizontal orientation allows filled cans to be removed, and another set of empty cans to be positioned on the weigh plates for filling. Thus, embodiments include a stopping block configured and disposed to prevent downward travel of the weigh plate when the weigh plate is in a horizontal orientation.

Figure 4B:
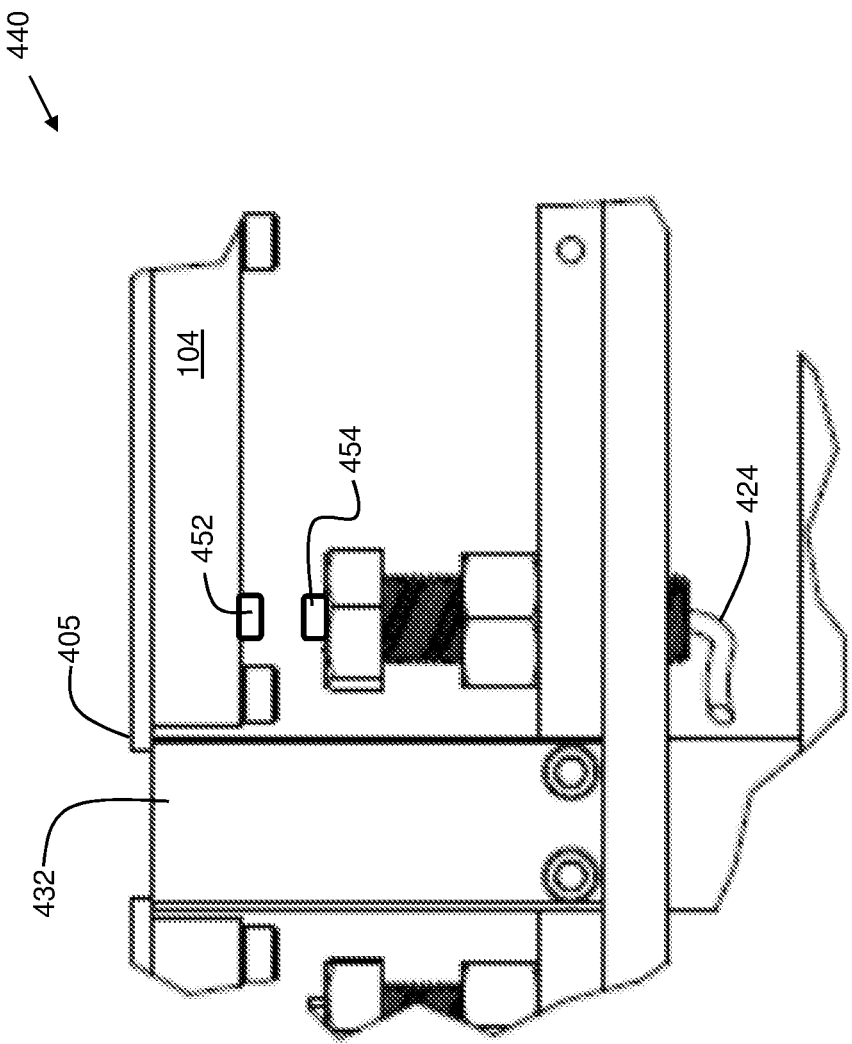
FIG. 4B shows additional detail of a fill sensor in an embodiment of the present invention.

FIG. 4B shows additional detail 440 of a fill sensor in an alternative embodiment of the present invention. Sensor 454 is a proximity sensor. When magnet 452 comes within a predetermined proximity to sensor 454, an electrical signal is transmitted via wire 424 to a controller, such as a microprocessor, microcontroller, programmable controller, or other suitable processor-based electronic device. This embodiment is contactless, and thus may provide improved reliability over the contact sensor. Thus, in embodiments, the sensor comprises a proximity sensor.

Figure 4C:
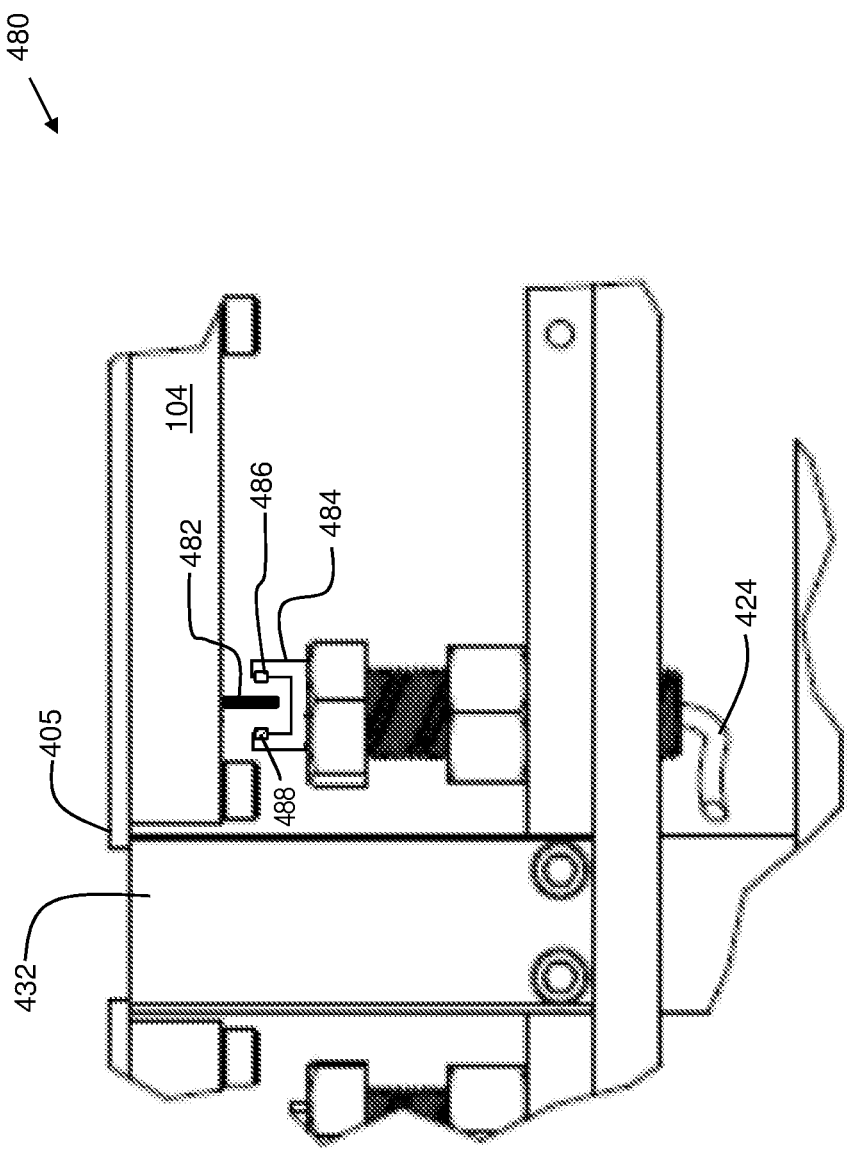
FIG. 4C shows additional detail of a fill sensor in an embodiment of the present invention.

FIG. 4C shows additional detail 480 of a fill sensor in another alternative embodiment of the present invention. Sensor 484 is an optical sensor. Flange 482 is affixed to the underside of the weigh plate 104. When flange 482 breaks the plane between optical transmitter 486 and optical receiver 488, an electrical signal is transmitted via wire 424 to a controller, such as a microprocessor, microcontroller, programmable controller, or other suitable processor-based electronic device. This embodiment is contactless. In embodiments, the sensor comprises an optical sensor. In embodiments, the optical sensor indicates a full condition when it asserts a signal. The full condition can represent the event that a beverage container has been filled to a predetermined level.

The sensors of FIGS. 4A-4C are exemplary, and embodiments are not limited to these sensors. Other sensors now known or hereafter developed may also be used in embodiments of the present invention.

Figure 5A:
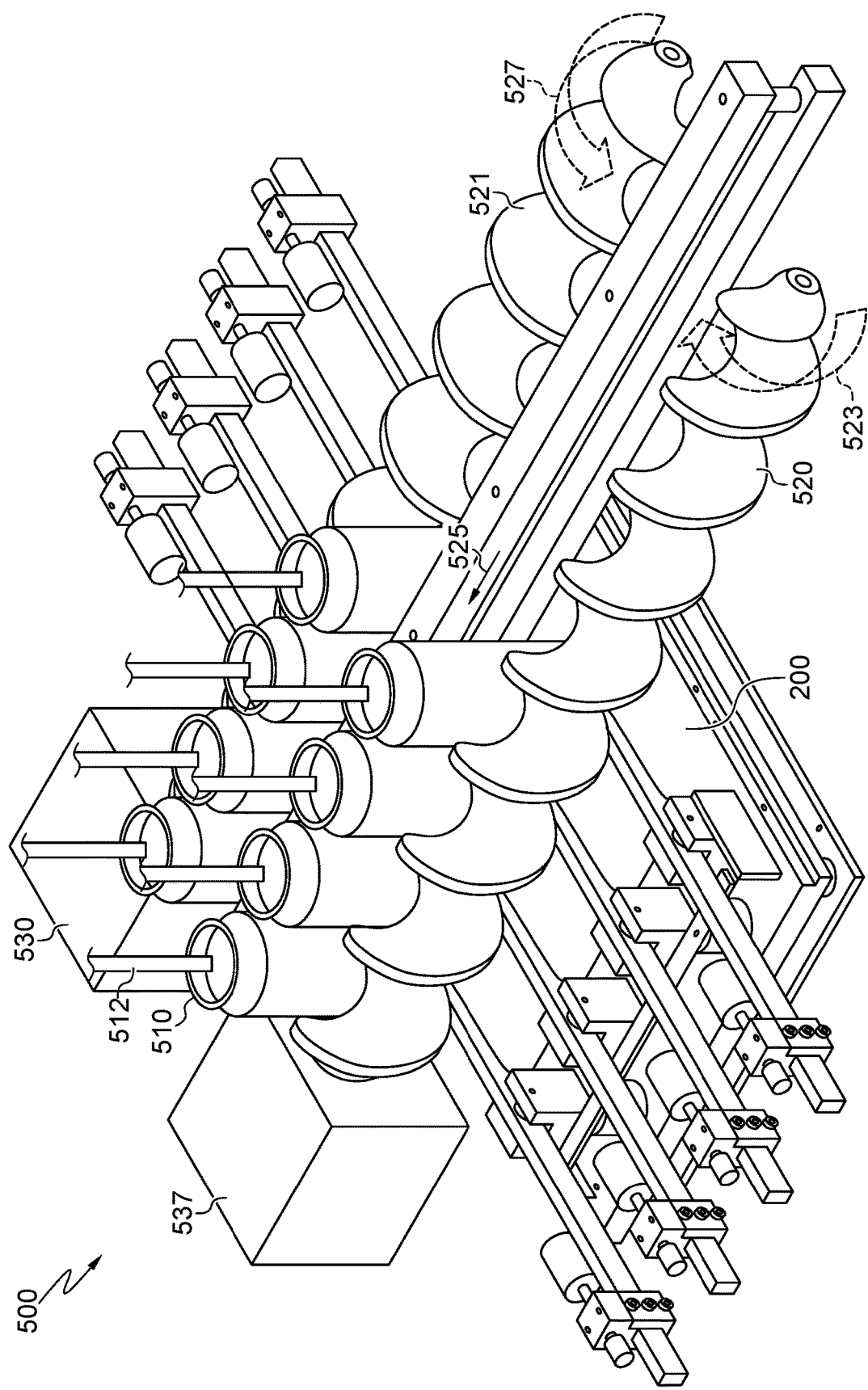
FIG. 5A shows a perspective view of a liquid product dispensing system in accordance with embodiments of the present invention.
Figure 5B:
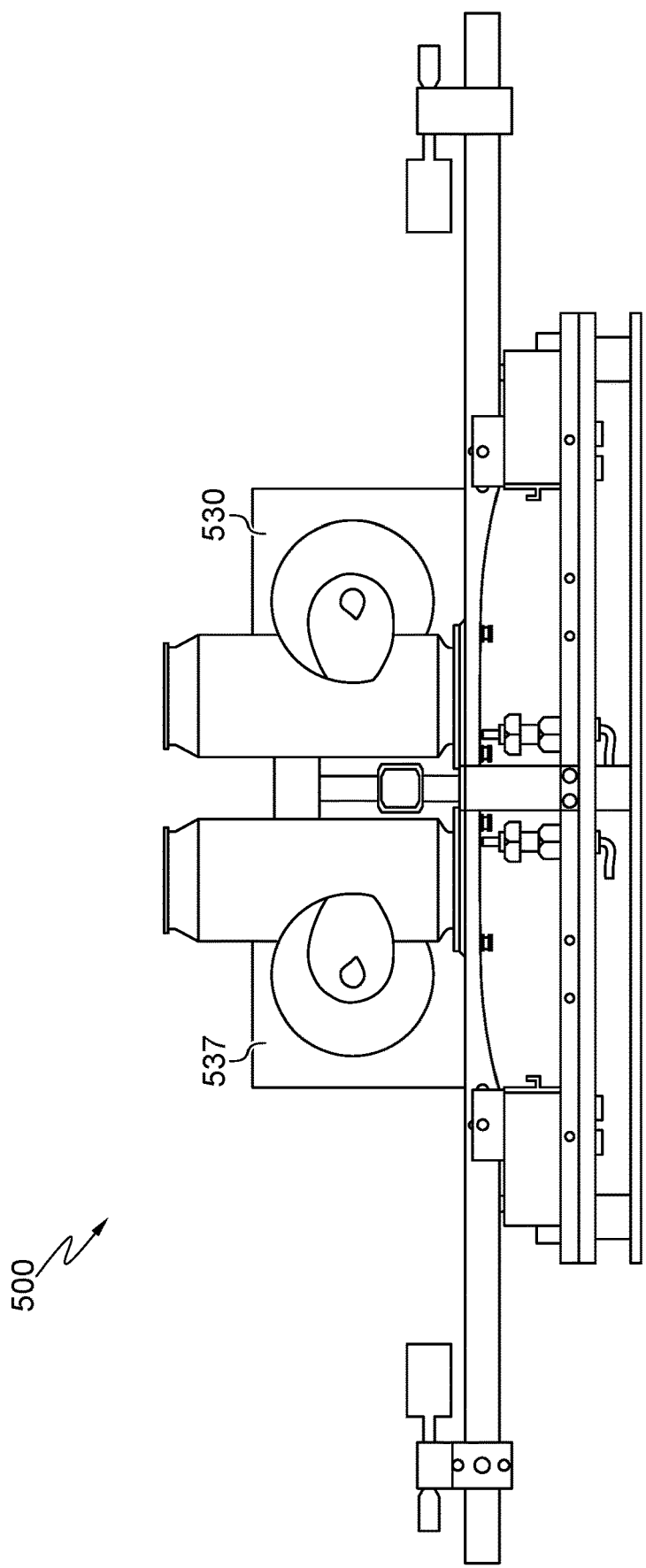
FIG. 5B shows a front view of the product dispensing system of FIG. 5A.

FIG. 5A shows a liquid product dispensing system 500 in accordance with embodiments of the present invention. FIG. 5B shows a front view of the product dispensing system of FIG. 5A as viewed facing the direction indicated by arrow 525. The bank 200 of balance apparatuses has feed screw 520 and feed screw 521 disposed thereon. A plurality of cans, an example of which is pointed out at 510, are engaged by the feed screws and disposed under dispensing tubes, an example of which is pointed out at 512. Each can of the plurality of cans 510 is on a balance apparatus similar to balance apparatus 100 of FIG. 1A, and each can 510 has a corresponding fill sensor (e.g. 240 of FIG. 2D) associated with it. As each sensor indicates a full can, dispensing for the corresponding tube 512 is terminated. When all eight sensors indicate dispensing complete, the transport system is activated by activating two motors that operate feed screws individually. In embodiments the motors may be servo motors. Motor 530 is mechanically coupled to feed screw 521. Motor 537 is coupled to feed screw 520. This allows feed screw 520 and feed screw 521 to be independently operated. The rotary motion of the motors advance feed screws 520 and 521. Feed screw 520 moves in the direction indicated by arrow 523, and feed screw 521 moves in the direction indicated by arrow 527, causing the cans 510 to move in the direction indicated by arrow 525. This takes the cans 510 off of the liquid product dispensing system, and on to subsequent stages in the canning process (e.g. lids, labeling, etc.). In embodiments, the transport mechanism comprises a feed screw. Other embodiments may utilize a different transport mechanism such as a conveyor belt, robotic pick-and-place arms, or other suitable transport mechanism.

Figure 6A:
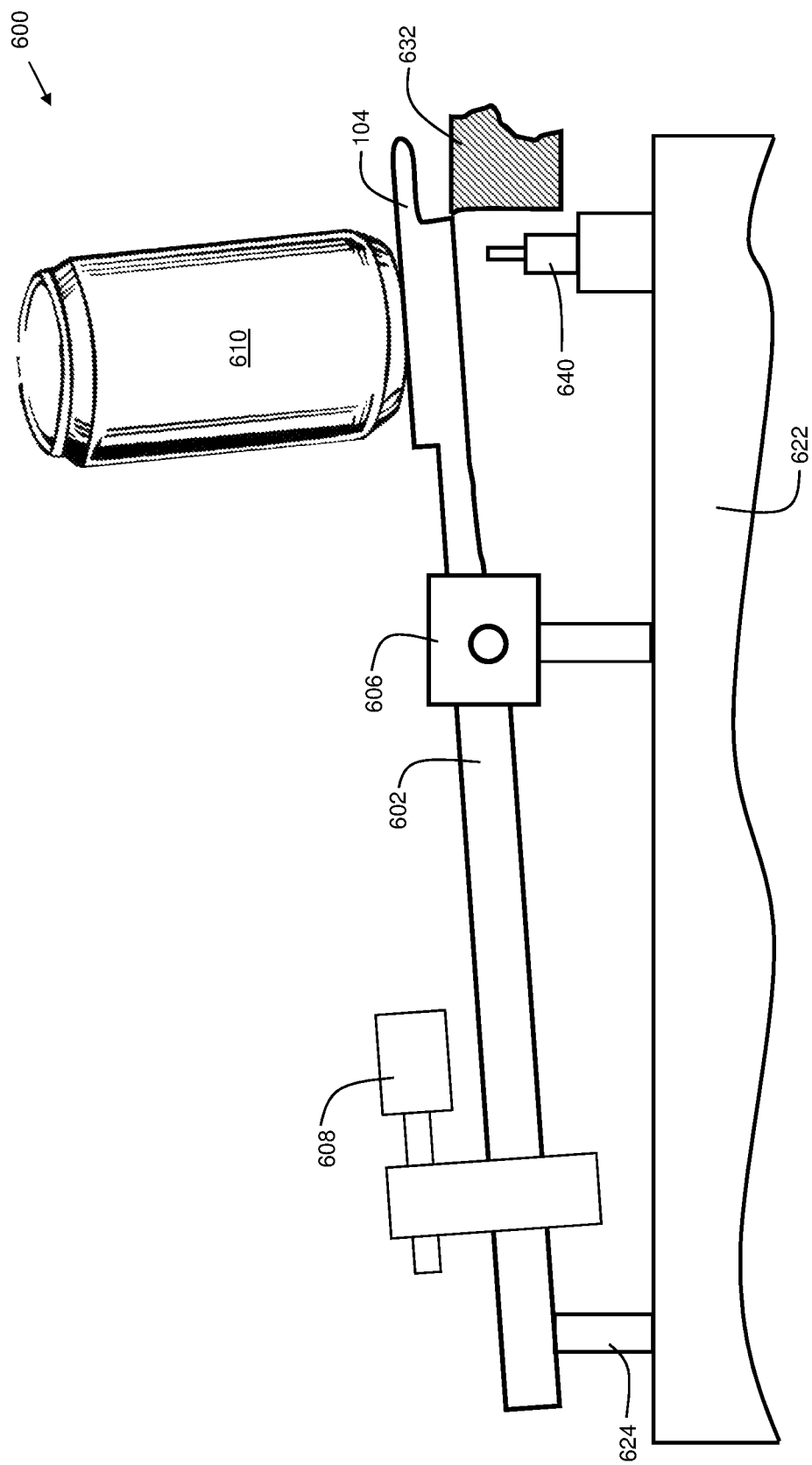
FIG. 6A shows details of a liquid product dispensing system in accordance with embodiments of the present invention with an empty can.

FIG. 6A shows details of a liquid product dispensing system 600 in accordance with embodiments of the present invention with an empty can 610. The counterweight 608 is set to a position along balance arm 602 such that, with the empty can 610, the counterweight causes the balance arm 602 to pivot about the fulcrum block 606 such that the weigh plate 104 rises up and does not make contact with sensor 640. The fulcrum block 606 and sensor 640 are disposed on base 622. A weigh plate lockdown mechanism comprises an actuator 624. The actuator 624 is used to secure the weigh plate 104 in a horizontal orientation for transporting cans on/off of the weigh plate. Thus, embodiments include a weigh plate lockdown mechanism configured and disposed to secure the weigh plate in a horizontal orientation. In embodiments, the weigh plate lockdown mechanism comprises an actuator configured and disposed to extend the balance arm on an opposite side of the fulcrum block from the weigh plate.

Figure 6B:
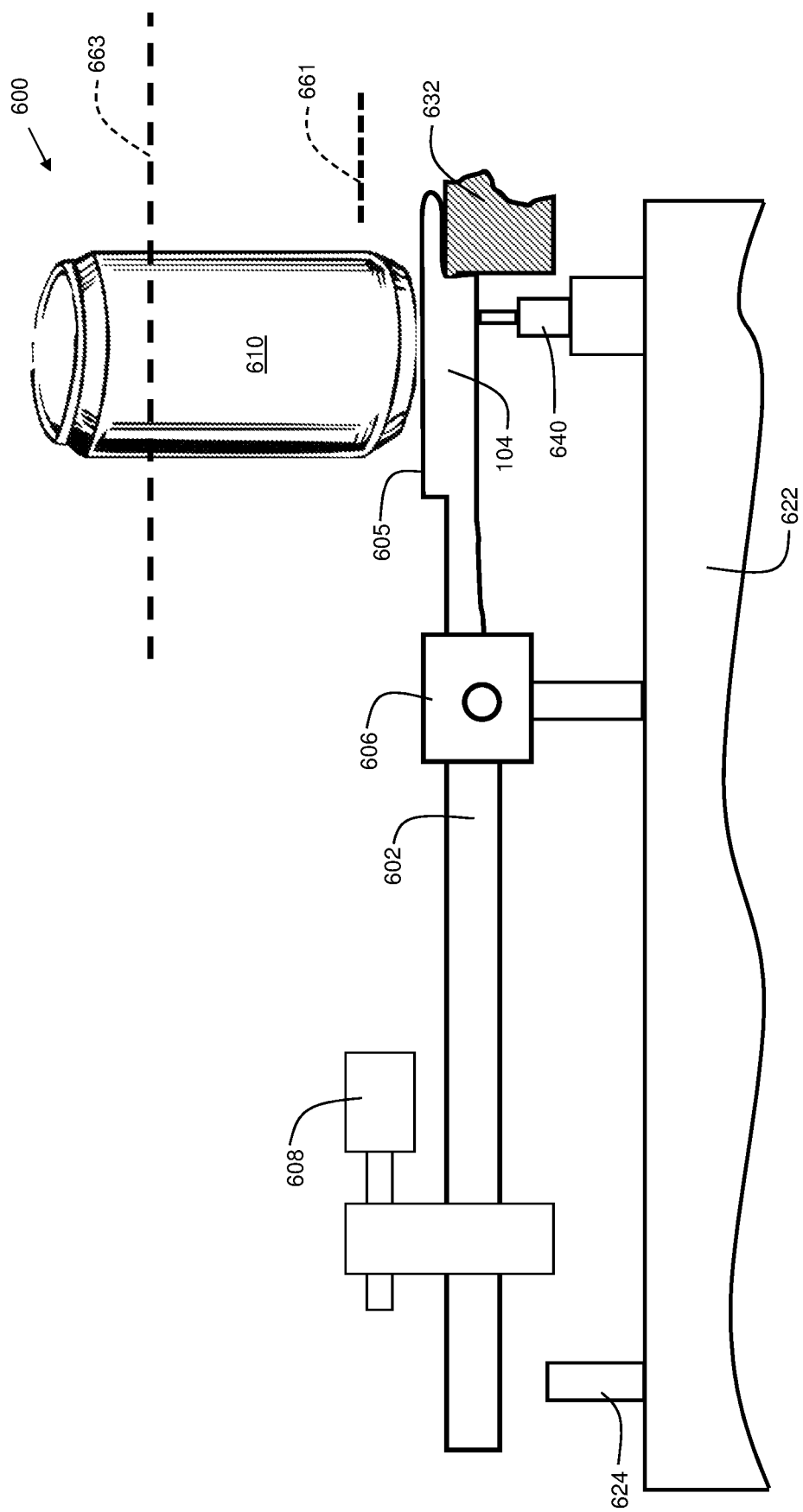
FIG. 6B shows details of a liquid product dispensing system in accordance with embodiments of the present invention with a full can.

FIG. 6B shows details of a liquid product dispensing system 600 in accordance with embodiments of the present invention with a full can. With the can 610 filled with product to fill line 663, the can is now heavy enough to cause the weigh plate 104 to contact the fill sensor 640. This causes an electrical signal to be generated, and the electrical signal is received by a controller to terminate dispensing upon receiving the electrical signal. The stopping block 632 limits the travel of the weigh plate 104 to a horizontal orientation, such that top surface 605 of the weigh plate 104 is parallel with horizontal axis 661.

Figure 6C:
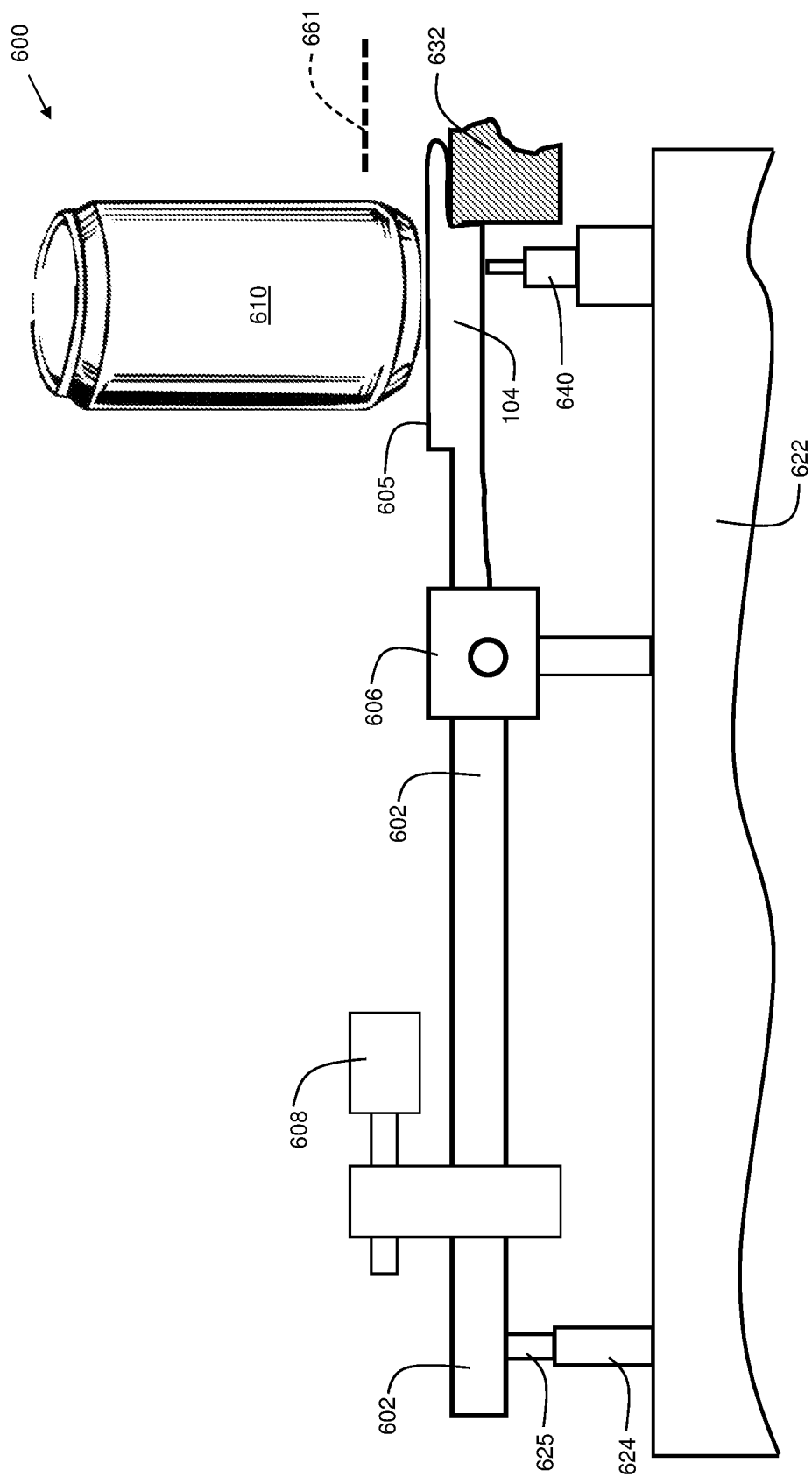
FIG. 6C shows details of a liquid product dispensing system in accordance with embodiments of the present invention with activation of the weigh plate lockdown mechanism.

FIG. 6C shows details of a liquid product dispensing system 600 in accordance with embodiments of the present invention with activation of the weigh plate lockdown mechanism. Before the can 610 is removed from the weigh plate 104 (e.g., by turning feed screw 520 of FIG. 5A), the actuator 624 moves extension 625 into place against balance bar 602, forcing top surface 605 of weigh plate 104 into a horizontal orientation, such that top surface 605 is parallel with horizontal axis 661.

Figure 6D:
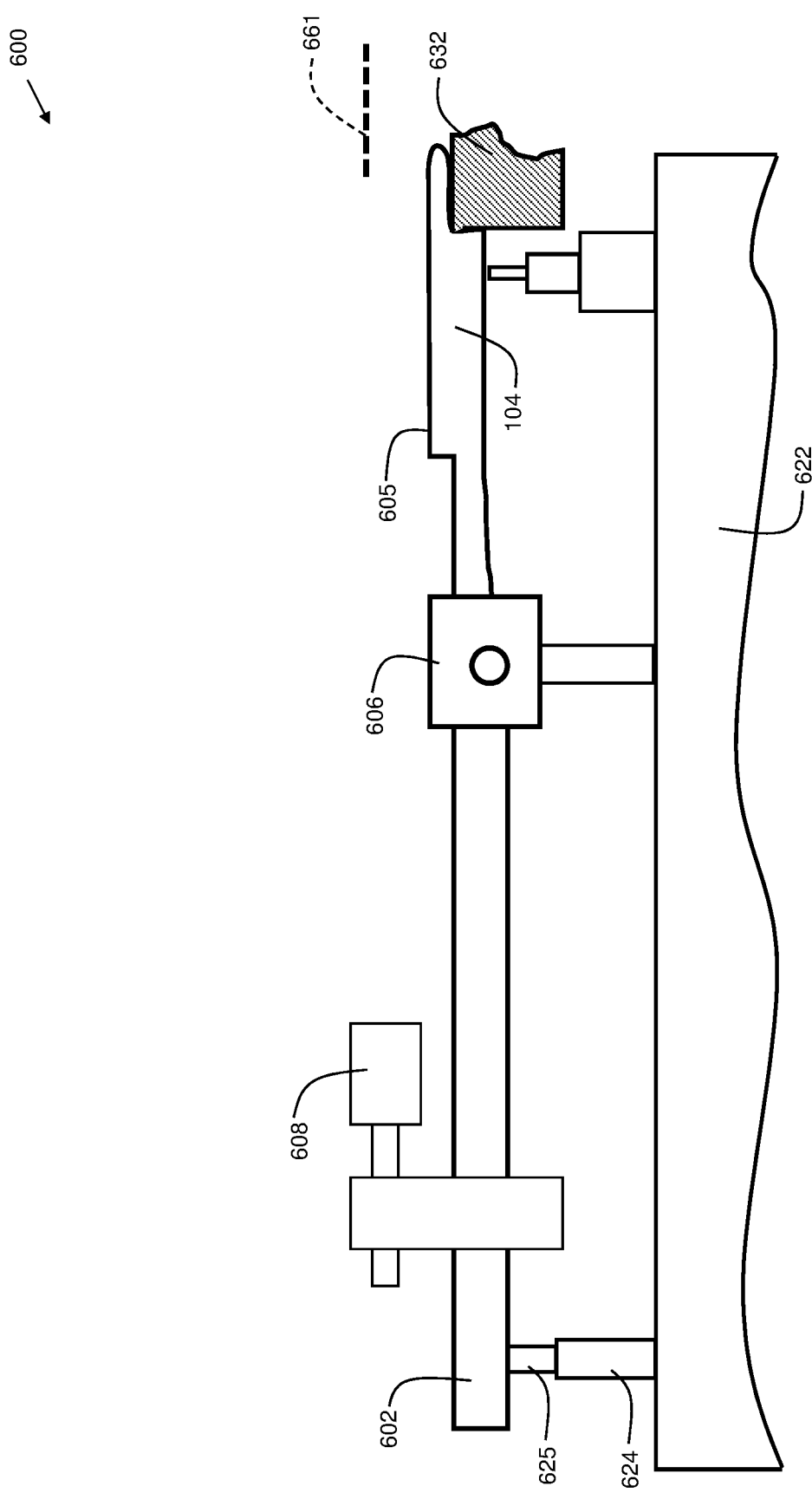
FIG. 6D shows details of a liquid product dispensing system in accordance with embodiments of the present invention with no can.

FIG. 6D shows details of a liquid product dispensing system 600 after removal of the full can. With the full can removed, the actuator 624 remains extended, and the weigh plate 104 is now ready to receive another can via the transport mechanism.

FIG. 7 shows details of a liquid product dispensing system 700 in accordance with alternative embodiments of the present invention. In this embodiment, arm 702 is affixed to block 743. Block 743 is affixed to post 741. Post 741 is affixed to base 722. Post 745 is affixed to base 722 adjacent post 741. Arm 702 cantilevers over post 745. A strain gauge 747 is affixed to the arm 702 and generates an electrical signal proportional to the downward force exerted by can 710. The system 700 is configured such that when the signal from strain gauge 747 indicates that can 710 is full, the dispensing of the can 710 is terminated. In this embodiment, there is no counterweight, and thus, this embodiment does not require counterweight adjustments.

Accordingly, embodiments include a liquid product dispensing system comprising a product weighing system. The product weighing system comprises a weigh plate, a strain gauge mechanically coupled to the weigh plate, and an electronic circuit configured and disposed to generate a trigger event in response to a predetermined strain indicated by the strain gauge. The liquid product dispensing system further comprises a dispensing system having a liquid dispensing port. The dispensing system is configured and disposed to stop dispensing upon detecting the trigger event from the electronic circuit.

Figure 8:
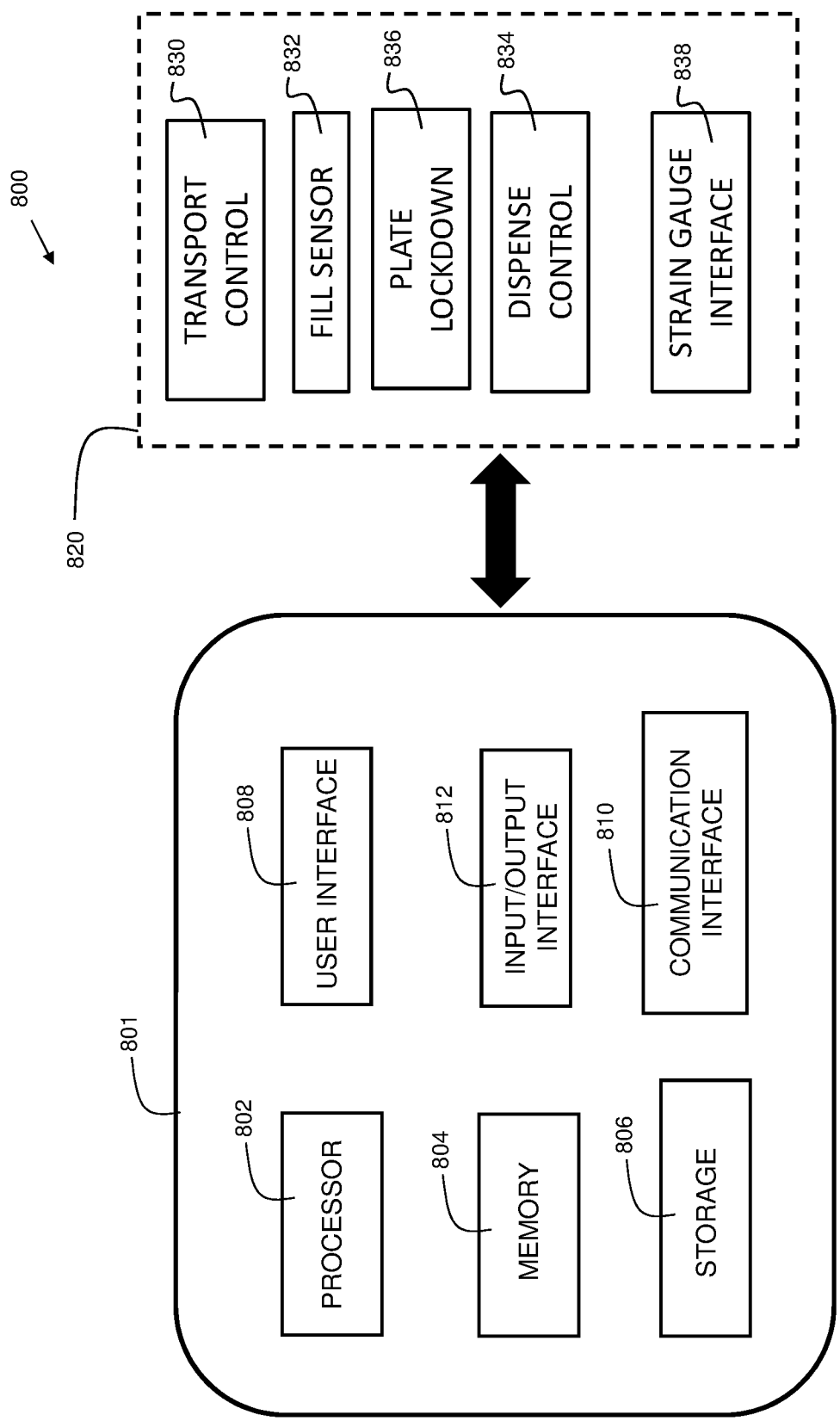
FIG. 8 shows a block diagram in accordance with embodiments of the present invention.

FIG. 8 shows a block diagram 800 in accordance with embodiments of the present invention. Controller 801 is an electronic computing device. Controller 801 includes a processor 802, and a memory 804 coupled to the processor 802. Memory 804 may include dynamic random-access memory (DRAM), static random-access memory (SRAM), magnetic storage, and/or a read only memory such as flash, EEPROM, optical storage, or other suitable memory. In some embodiments, the memory 804 may be a non-transitory computer readable hardware storage device. Memory 804 stores instructions, which when executed by the processor, implement steps of embodiments of the present invention.

Controller 801 further includes storage 806. In embodiments, storage 806 may include one or more magnetic storage devices such as hard disk drives (HDDs). Storage 806 may additionally include one or more solid state drives (SSDs).

Controller 801 further includes a user interface 808, examples of which include a liquid crystal display (LCD), a plasma display, a light emitting diode (LED) display, an organic LED (OLED) display, or other suitable display technology. The user interface 808 may further include a keyboard, mouse, or other suitable human interface device. In some embodiments, user interface 808 may be a touch screen, incorporating a capacitive or resistive touch screen in some embodiments.

Controller 801 further includes a communication interface 810. The communication interface 810 may be a wired communication interface that includes Ethernet, Gigabit Ethernet, or the like. In embodiments, the communication interface 810 may include a wireless communication interface that includes modulators, demodulators, and antennas for a variety of wireless protocols including, but not limited to, Bluetooth™, Wi-Fi, and/or cellular communication protocols for communication over a computer network.

Controller 801 further includes an input/output interface 812. Input/output interface 812 may include one or more input, output, and/or bidirectional pins to interface with peripheral system 820. Peripheral system 820 includes transport control 830. Transport control 830 includes motors, circuits, and/or logic to operate the transport system to move cans through the liquid product dispensing system.

Peripheral system 820 further includes fill sensor 832. Fill sensor 832 generates an electrical signal indicative of a full can. Peripheral system 820 further includes dispense control 834. Dispense control 834 includes motors, pumps, valves, circuits, and/or logic to operate the dispensing system top start and stop the flow of liquid product through the dispensing tubes (e.g. 512 of FIG. 5A).

Embodiments can include a controller configured and disposed to control the liquid product dispensing system. The controller comprises a processor; an input/output interface coupled to the processor; and a memory coupled to the processor. The memory contains instructions, that when executed by the processor, perform steps including: activating the weigh plate lockdown mechanism; operating a transport mechanism to place a can on the weigh plate; deactivating the weigh plate lockdown mechanism; starting product dispensing; in response to detecting a full condition, ending product dispensing; reactivating the weigh plate lockdown mechanism; and operating the transport mechanism to remove the can from the weigh plate.

Peripheral system 820 further includes plate lockdown module 836. Plate lockdown module 836 includes the circuitry and devices to secure the weigh plate in a horizontal orientation. In embodiments, the plate lockdown module 836 includes an actuator (such as actuator 624 of FIG. 6C).

In embodiments that include a strain gauge (e.g. 700 of FIG. 7), the peripheral system 820 may further include strain gauge interface 838. Strain gauge interface 838 comprises electronic circuits and/or digital logic to obtain an electric signal from the strain gauge that is indicative of a full condition of a can on a weigh plate. In strain gauge embodiments, the plate lockdown module 836 may or may not be present.

Figure 9:
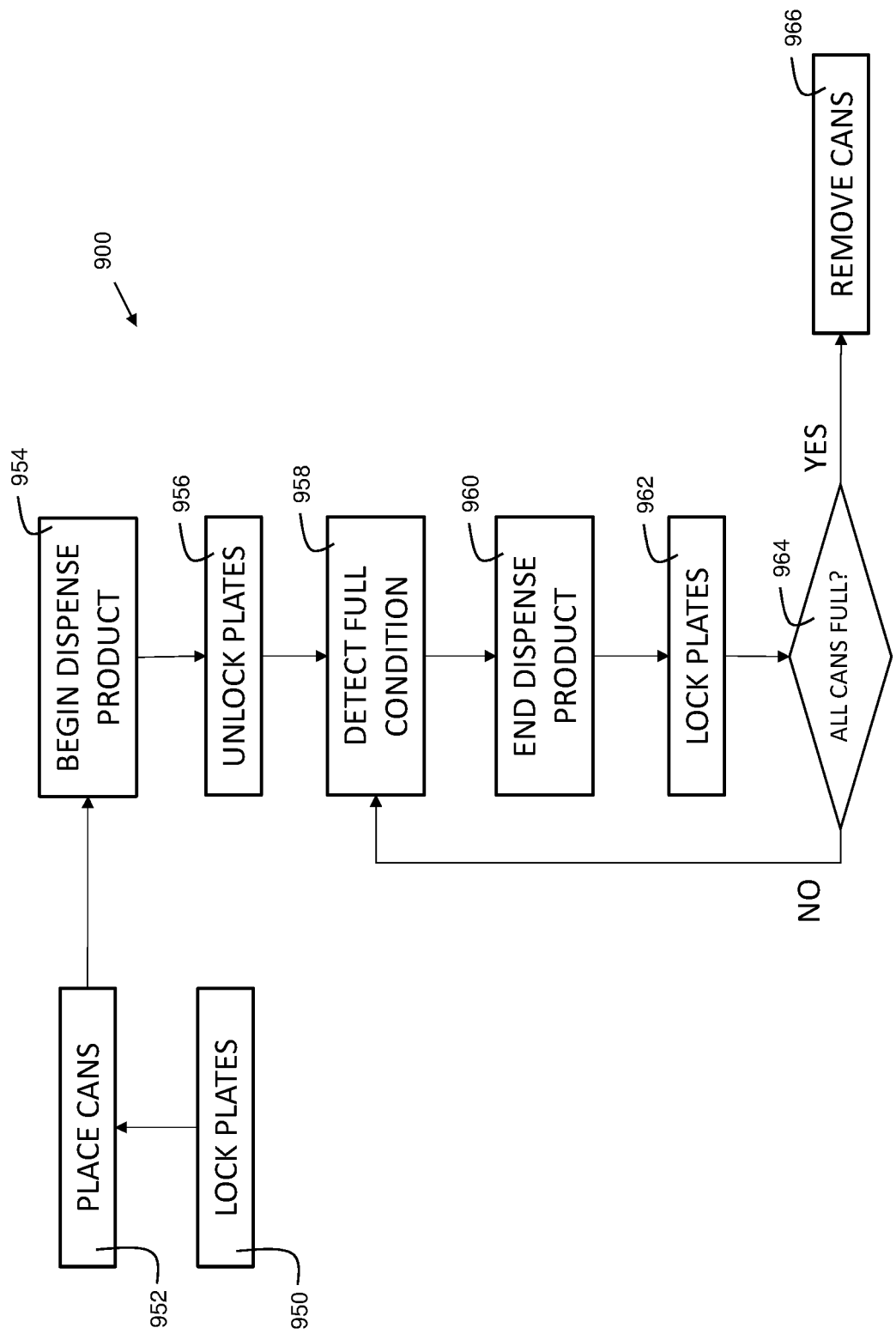
FIG. 9 is a flowchart indicating process steps for embodiments of the present invention.

FIG. 9 is a flowchart 900 indicating process steps for embodiments of the present invention. In process step 950, the weigh plates are locked. This configuration is shown in FIG. 6D. In process step 952, empty cans are placed on the weigh plates. This configuration is shown in FIG. 6C. In process step 954, product dispensing begins. In process step 956, the weigh plates are unlocked. This configuration is shown in FIG. 6A. In embodiments, liquid product from a pressurized source is fed through a dispensing tube into a can. In process step 958, a full condition is detected. This configuration is shown in FIG. 6B. In process step 960, the product dispensing ends. In process step 962, the weigh plate is again locked. In process step 964, a check is made to determine if all cans in the bank are full. If one or more cans are not yet full, the process returns to step 958. If all cans are full, the process continues to step 966 where the cans are removed from the liquid product dispensing system. Thus, embodiments include operating a transport mechanism to place a can of a selected volume (e.g., 12-ounce, 16-ounce, etc.) on the weigh plate; starting product dispensing; in response to detecting the trigger event, ending product dispensing; and operating the transport mechanism to remove the can from the weigh plate.

Figure 10:
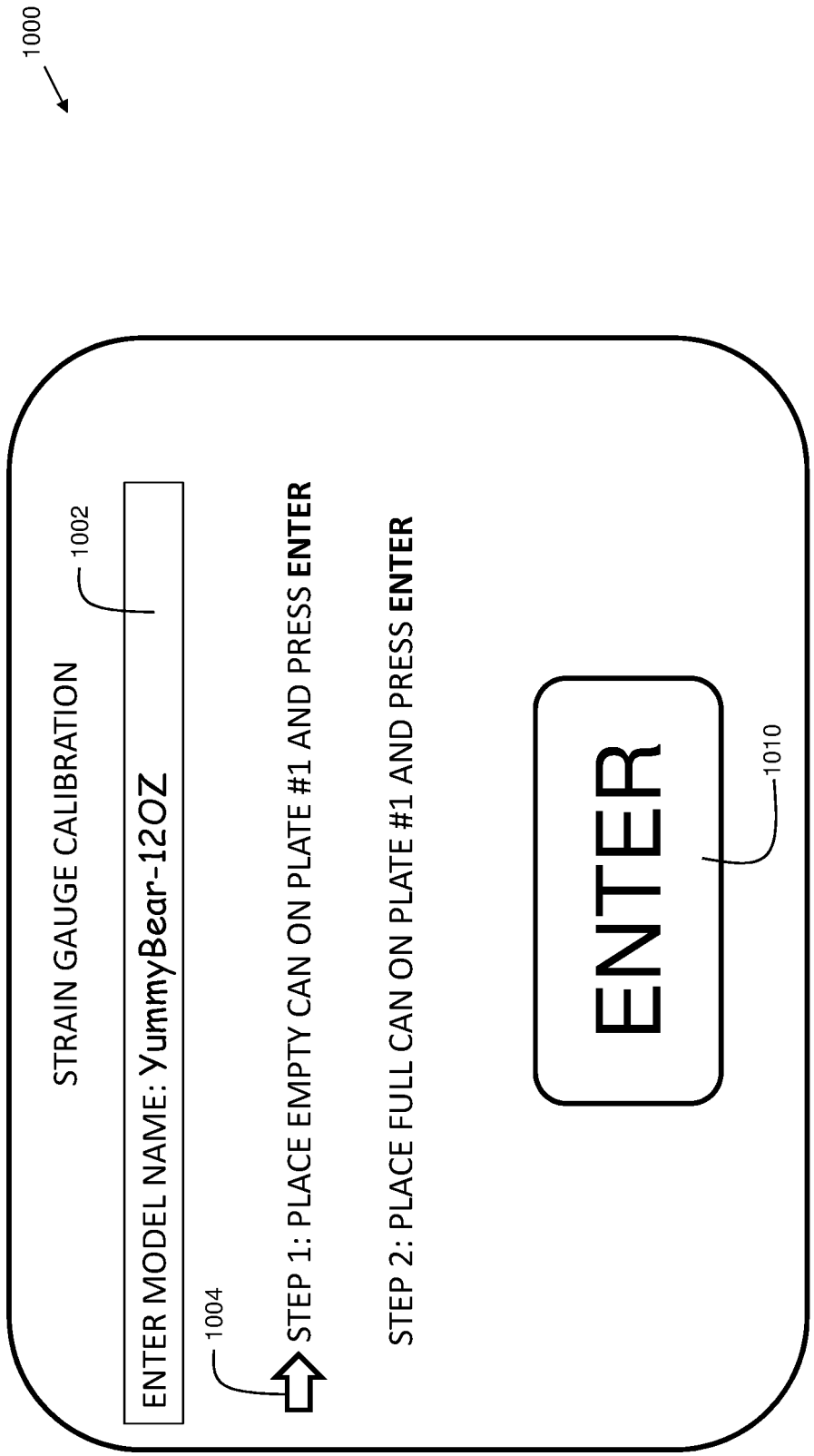
FIG. 10 is an exemplary user interface for embodiments of the present invention.

FIG. 10 is an exemplary user interface 1000 for embodiments of the present invention. The user interface 1000 may be used for embodiments utilizing a strain gauge, such as shown in FIG. 7. User interface 1000 shows a calibration/setup screen for embodiments of the present invention. In embodiments, for each weigh plate, a calibration procedure may be used to determine the electrical signal corresponding to an empty can, and the electrical signal corresponding to a full can. In embodiments, the user may be prompted to enter a model name in field 1002. The user is then prompted by cursor 1004 to perform the steps of placing an empty can on a particular weigh plate (plate #1 in the example of FIG. 10) and pressing enter 1010. Pressing enter 1010 causes the electrical signal generated by the strain gauge (747 of FIG. 7) corresponding to an empty can to be recorded to the storage (806 of FIG. 8) of the controller 801. The user is then prompted by cursor 1004 to perform the steps of placing a full can on a particular weigh plate (plate #1 in the example of FIG. 10) and pressing enter 1010. Pressing enter 1010 causes the electrical signal generated by the strain gauge (747 of FIG. 7) corresponding to a full can to be recorded to the storage (806 of FIG. 8) of the controller 801. This may be performed for all plates. Thus, in embodiments with 8 weigh plates, this procedure is performed 8 times. The user interface 1000 can guide an operator to perform empty and full can measurements on all weigh plates in the bank(s). The electrical signals may be associated with the model name specified in field 1002 and stored as a file, collection of files, or database in the storage 806 of controller 801. In embodiments, multiple models may be stored and/or retrieved. Thus, there can be models for 12-ounce, 16-ounce, and 20-ounce (fluid ounce) can sizes. Additionally, the density of the products may differ, such that a full can of one product may not have the same weight as the same number of fluid ounces (or milliliters) of another product. However, with embodiments of the present invention, models may be saved and later retrieved, allowing a manufacturing line to easily switch between different products during manufacturing. Thus, embodiments can include a controller configured and disposed to control the liquid product dispensing system. The controller comprises: a processor; an input/output interface coupled to the processor; a memory coupled to the processor, wherein the memory contains instructions, that when executed by the processor, perform steps including calibrating the strain gauge for a can volume.

Figure 11:
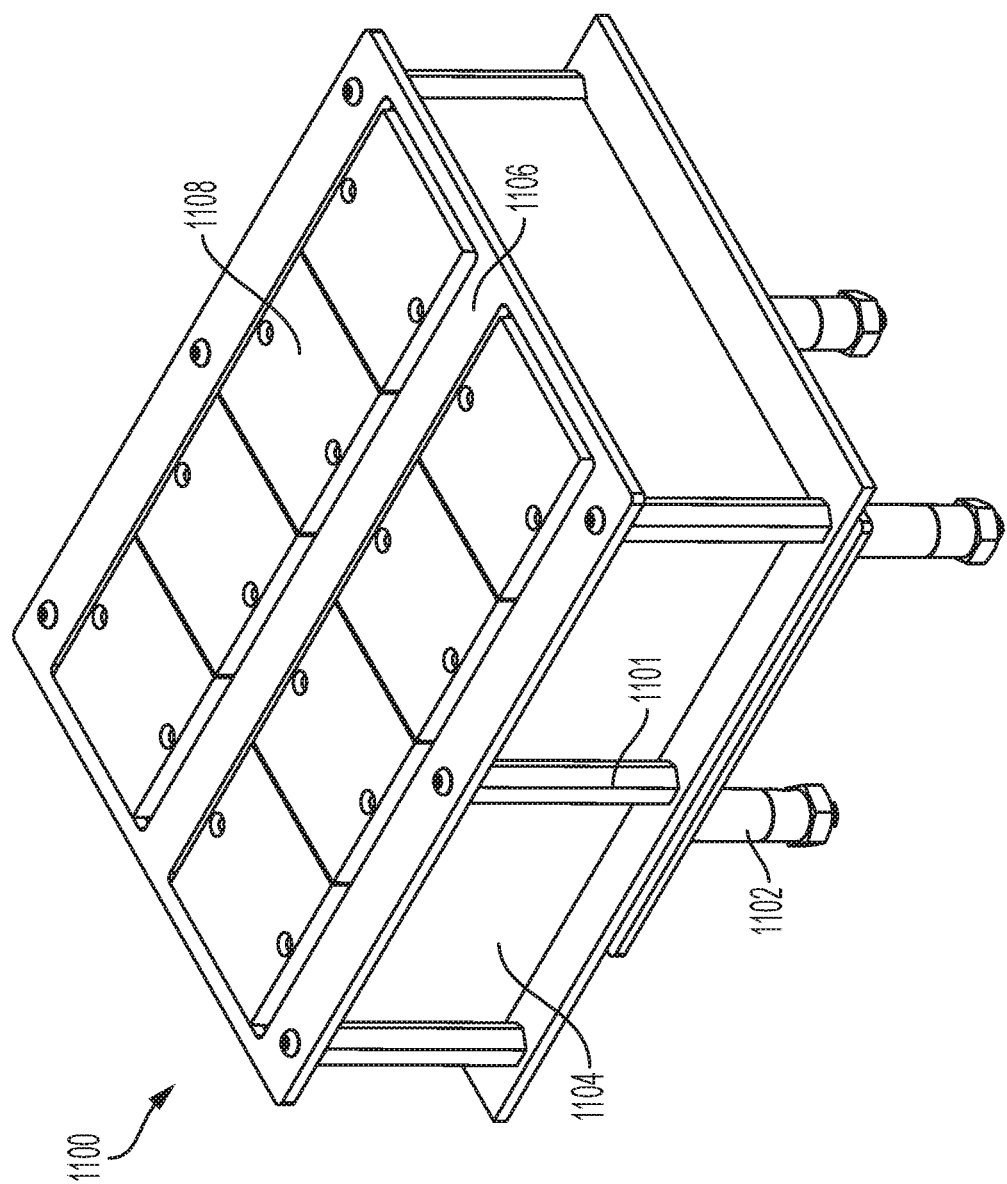
FIG. 11 shows a perspective view of a beverage container weighing apparatus in accordance with additional embodiments.

FIG. 11 shows a perspective view of a beverage container weighing apparatus 1100 in accordance with additional embodiments. The beverage container weighing apparatus 1110 comprises a frame 1101. A plurality of weigh plates, references generally as 1108, are disposed within the frame 1101. A stop plate 1106 is affixed to the frame. A plurality of panels, referenced generally as 1104, are installed on the frame 1101 to create a liquid-proof seal, preventing water or other fluids from entering the interior of the beverage container weighing apparatus 1100. A plurality of weigh plate lockdown actuators 1102 are disposed on the underside of the frame 1101. The actuators 1102 enable locking and unlocking of the weigh plates 1108. In embodiments, the weigh plate lockdown actuator comprises a pneumatic actuator. In some embodiments, the weigh plate lockdown actuator comprises an electromechanical actuator, such as a solenoid.

Figure 12:
FIG. 12 shows a top-down view of a beverage container weighing apparatus in accordance with additional embodiments.

FIG. 12 shows a top-down view of beverage container weighing apparatus 1100 in accordance with additional embodiments. In this view it can be seen that there are eight weigh plates formed in two rows. A first row of weigh plates comprises weigh plates 1108A, 1108B, 1108C, and 1108D. A second row of weigh plates comprises weigh plates 1108E, 1108F, 1108G, and 1108H. While two rows of four weigh plates each are shown in FIG. 12, this is a non-limiting example. In practice, more or fewer rows may be used, with more or fewer weigh plates per row. In some embodiments, each weigh plate is of an identical weight and/or identical size. In other embodiments, one or more rows may include weigh plates of differing weigh and/or size, to accommodate different sizes of beverage container.

Figure 13:
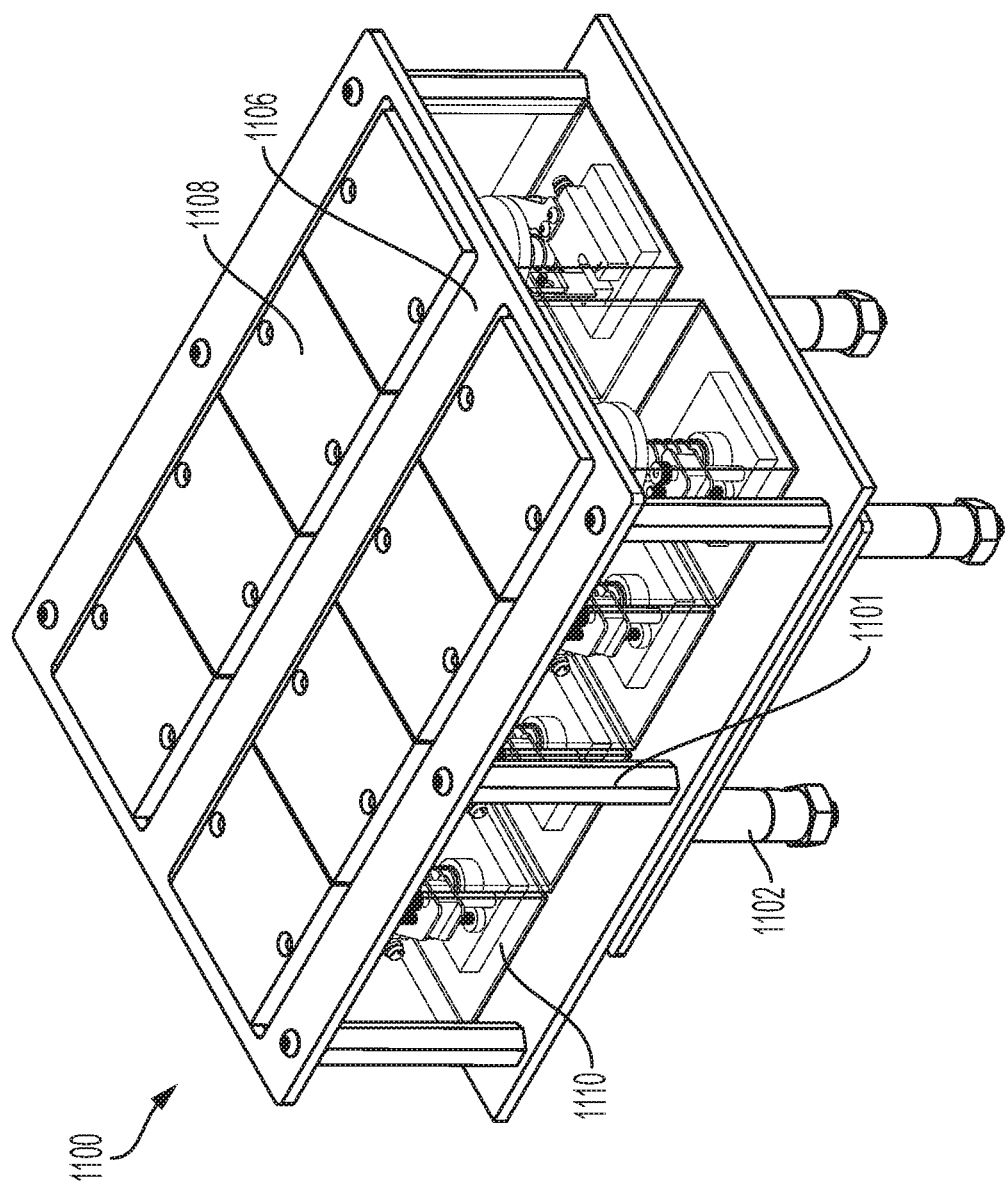
FIG. 13 shows a perspective view of a beverage container weighing apparatus in accordance with additional embodiments with panels removed to reveal internal components.

FIG. 13 shows a perspective view of beverage container weighing apparatus 1100 in accordance with additional embodiments. This view is similar to the view shown in FIG. 11, but with panels removed to reveal the internal components. These internal components include elements for weighing apparatuses for individual beverage containers that are described in further detail below.

Figure 14A:
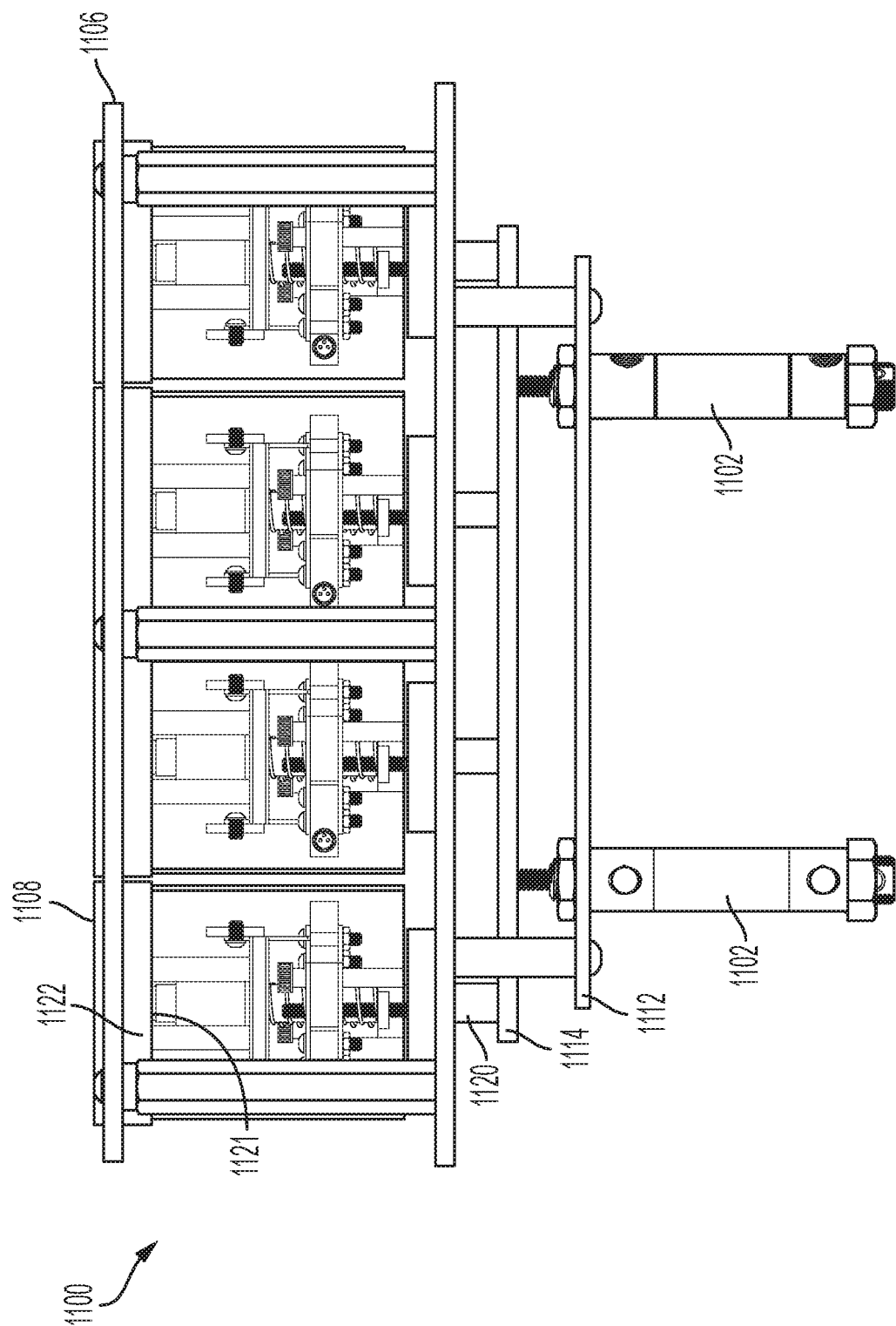
FIG. 14A shows a front view of a beverage container weighing apparatus in the locked configuration in accordance with additional embodiments with panels removed to reveal internal components.

FIG. 14A shows a front view of beverage container weighing apparatus 1100 in the locked configuration in accordance with additional embodiments with panels removed to reveal internal components. The actuators 1102 are secured to base 1112. To lock the weigh plates, the actuators 1102 extend, pushing the pressure plate 1114 which presses push rods 1120 upwards such that the top surface 1121 of the push rods 1120 contacts the container platform 1122 and pushes the container platform 1122 against the stop plate 1106. The corresponding weigh plate 1108 is attached to the container platform 1122 and held in place while a transport mechanism places containers on the weigh plates 1108. Once the containers are in place, the actuators retract, and then as the containers are filled to the predetermined level, the weigh plates lower, compressing the spring (e.g. 1128 of FIG. 15A), until the sensor (e.g. 1124 of FIG. 16A) is tripped. Thus, in embodiments, a weigh plate lockdown actuator is configured and disposed to secure the weigh plate against the stop plate by pushing a connected push rod against the container platform.

Figure 14B:
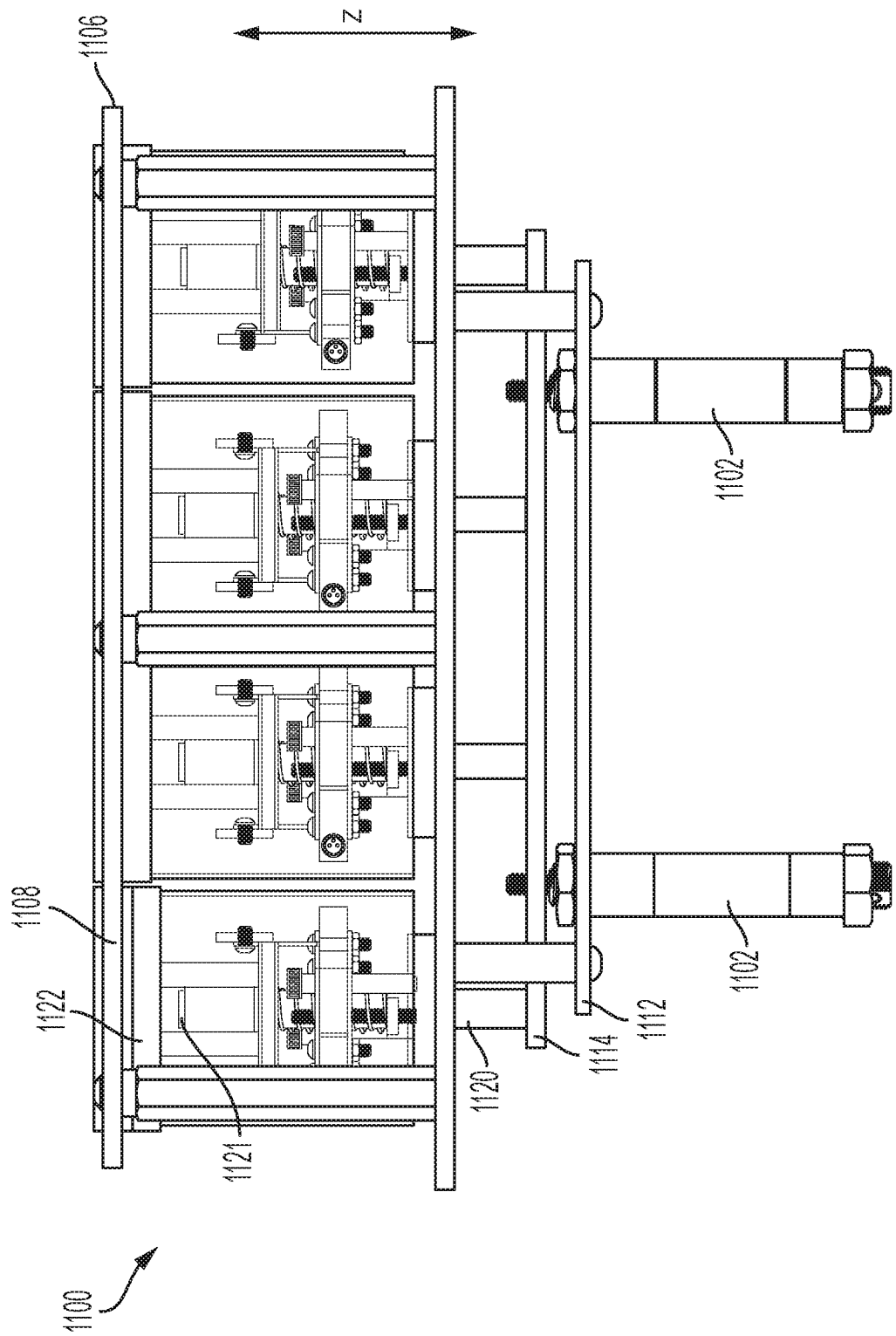
FIG. 14B shows a front view of a beverage container weighing apparatus in the unlocked configuration in accordance with additional embodiments with panels removed to reveal internal components.

FIG. 14B shows a front view of beverage container weighing apparatus 1100 in the unlocked configuration in accordance with additional embodiments with panels removed to reveal internal components. In this view, the actuators 1102 have retracted, causing the top surface 1121 to retract. The top surface 1121 of push rods 1120 are not contacting the container platform 1122 in this configuration. The container platform 1122 is maintained in position by a compression spring (1128 of FIG. 16A). With the push rods 1120 retracted, the weigh plates 1108 are able to move in a vertical (Z) direction in response to weight placed upon them.

Figure 15A:
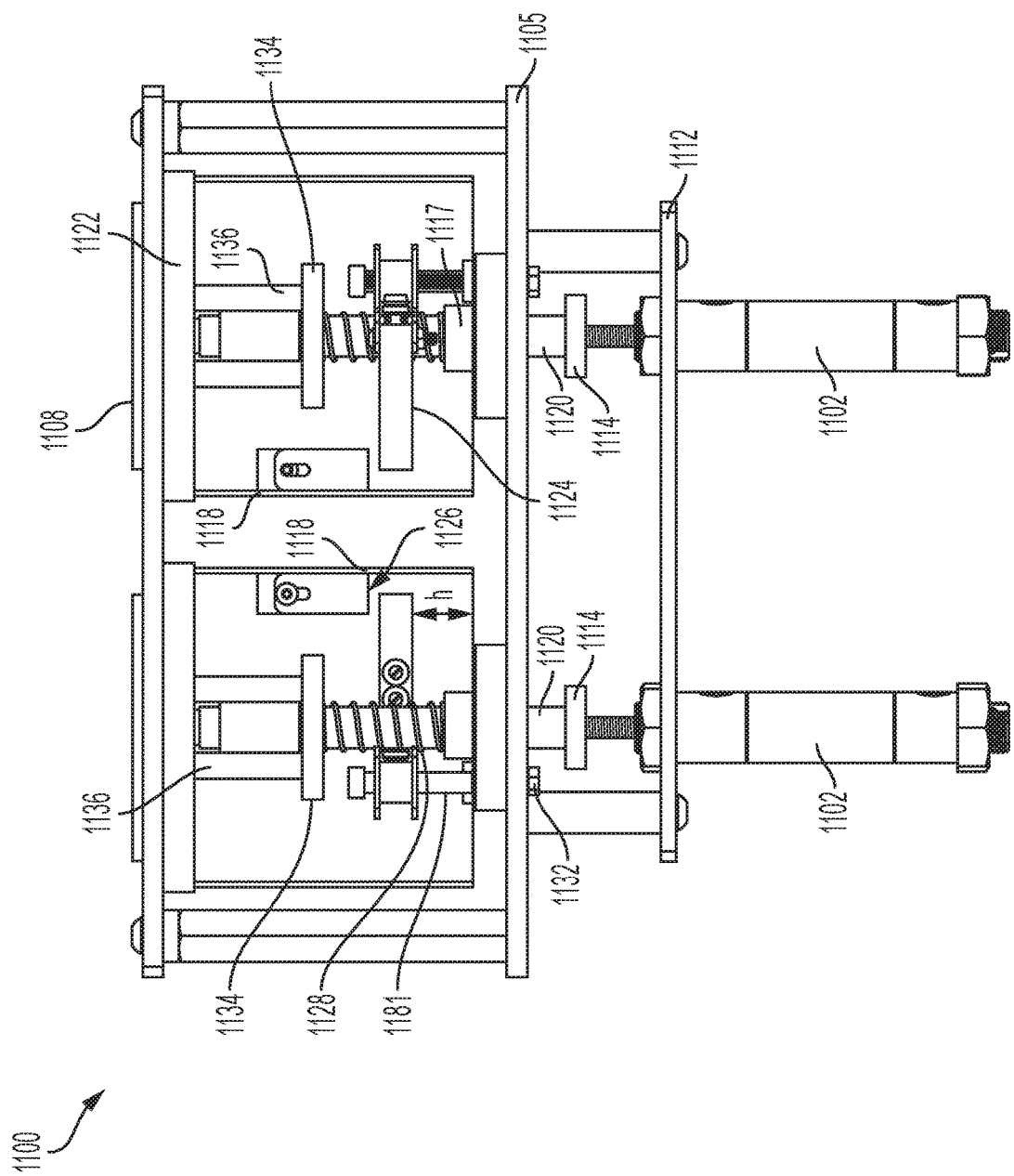
FIG. 15A shows a side view of a beverage container weighing apparatus in the locked configuration in accordance with additional embodiments with panels removed to reveal internal components.

FIG. 15A shows a side view of beverage container weighing apparatus 1100 in the locked configuration in accordance with additional embodiments with panels removed to reveal internal components. In this view the flange 1126 attached to a lateral wall (indicated generally as 1118) is visible. In embodiments utilizing an optical sensor (such as 1124 of FIG. 16A), the flange 1126 may be utilized to break the plane of the optical sensor in order to block emitted light from the optical sensor in order to indicate a trigger event such as a dispense-stop condition. A dispense-stop condition is a condition in which a beverage container placed on the weigh plate 1108 is considered to be full (or at other desired fill level), based on the flange 1126 triggering sensor 1124. The sensor 1124 is secured in place by sensor mount shaft 1181, and adjustable in height h by turning sensor adjustment screw 1132. Each weigh plate 1108 is affixed to a container platform 1122. The container platform 1122 is mechanically coupled to a linear bearing 1134 via a plurality of platform rods 1136.

Figure 15B:
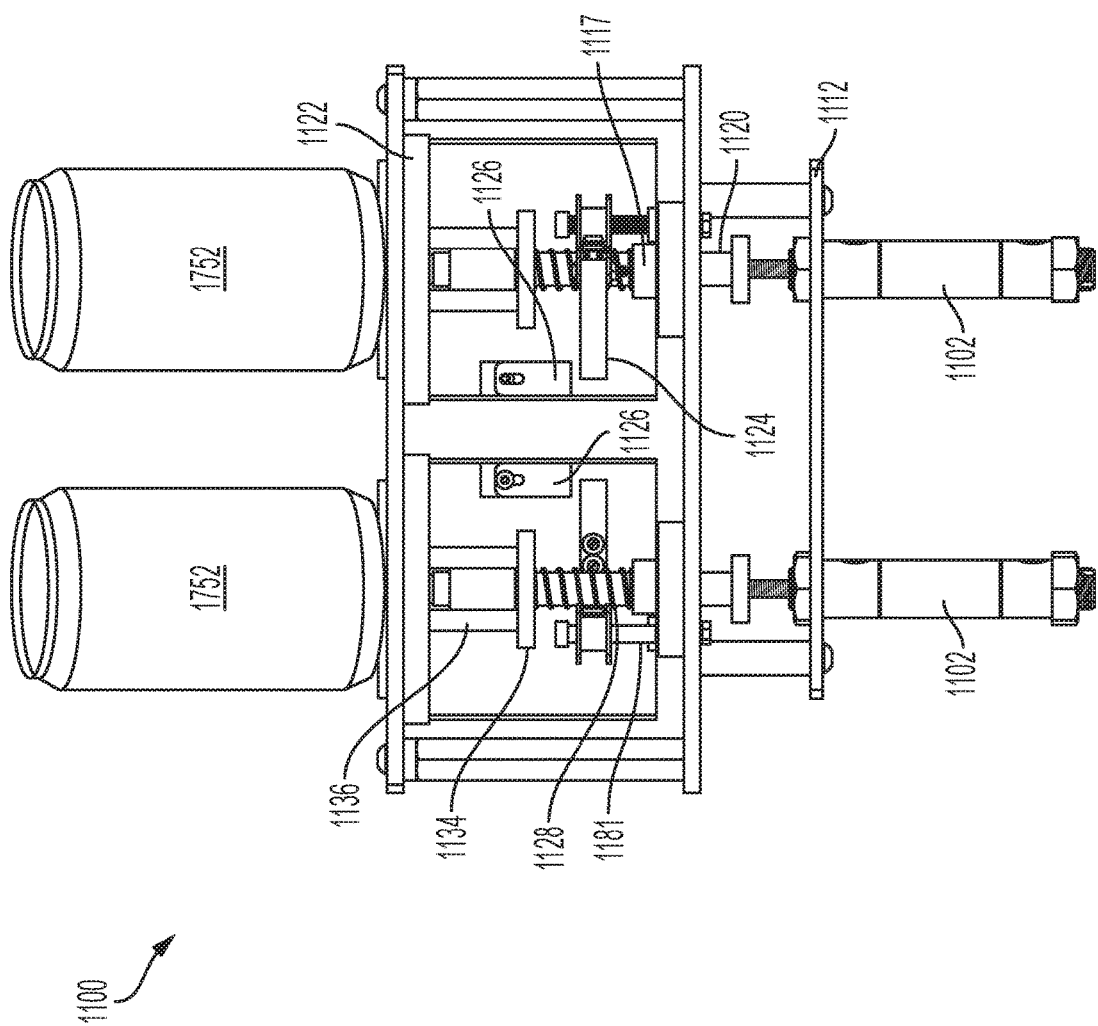
FIG. 15B shows a side view of a beverage container weighing apparatus in the locked with beverage containers placed thereon.

FIG. 15B shows a side view of a beverage container weighing apparatus in the locked configuration with beverage containers 1752 placed thereon. In this configuration, the actuators 1102 are still extended, which causes push rods 1120 to extend against the container platform to provide stability as the containers 1752 are placed onto the apparatus. The beverage containers 1752 may be placed on the weigh plate by a transport mechanism utilizing feed screws such as 520 of FIG. 5A. Other transport mechanisms are possible with disclosed embodiments.

Figure 15C:
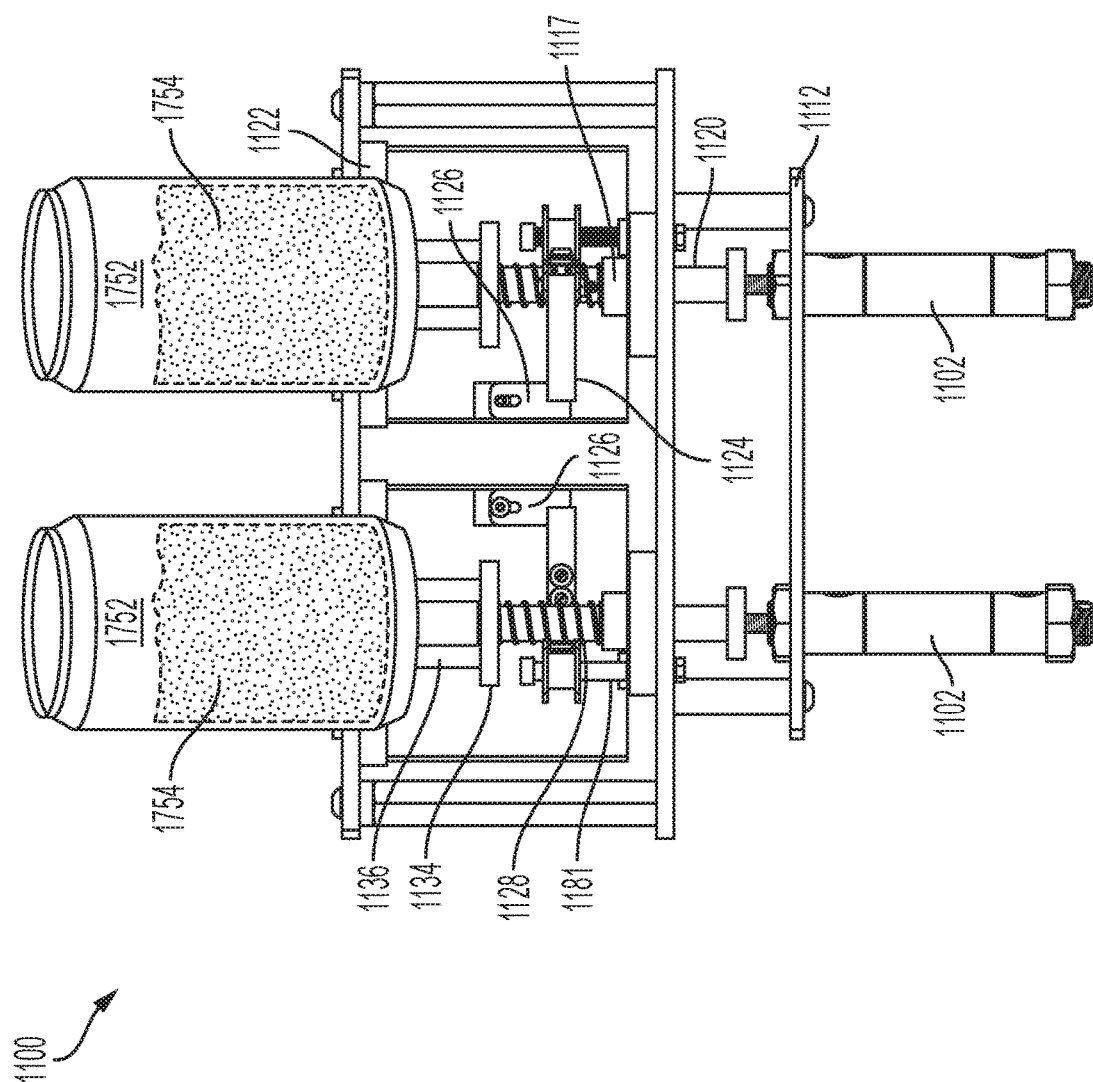
FIG. 15C shows a side view of a beverage container weighing apparatus in the dispensing-stop configuration in accordance with additional embodiments with panels removed to reveal internal components.

FIG. 15C shows a side view of a beverage container weighing apparatus in the dispensing-stop configuration in accordance with additional embodiments with panels removed to reveal internal components. In this view, the push rods 1120 are retracted due to retracting the actuators 1102. This allows the additional weight of contents 1754 to cause the lateral wall 1118 to lower, causing flange 1126 to lower and activate sensor 1124, which causes a dispense-stop signal to be asserted, stopping the dispensing of product into containers 1752. Embodiments include a lateral wall disposed perpendicular to the container platform, and a flange attached to an interior surface of the lateral wall. The flange is configured and disposed to trigger the optical sensor when a predetermined mass (e.g. a beverage container filled with 16 ounces of a beverage) is placed on the weigh plate.

Figure 16A:
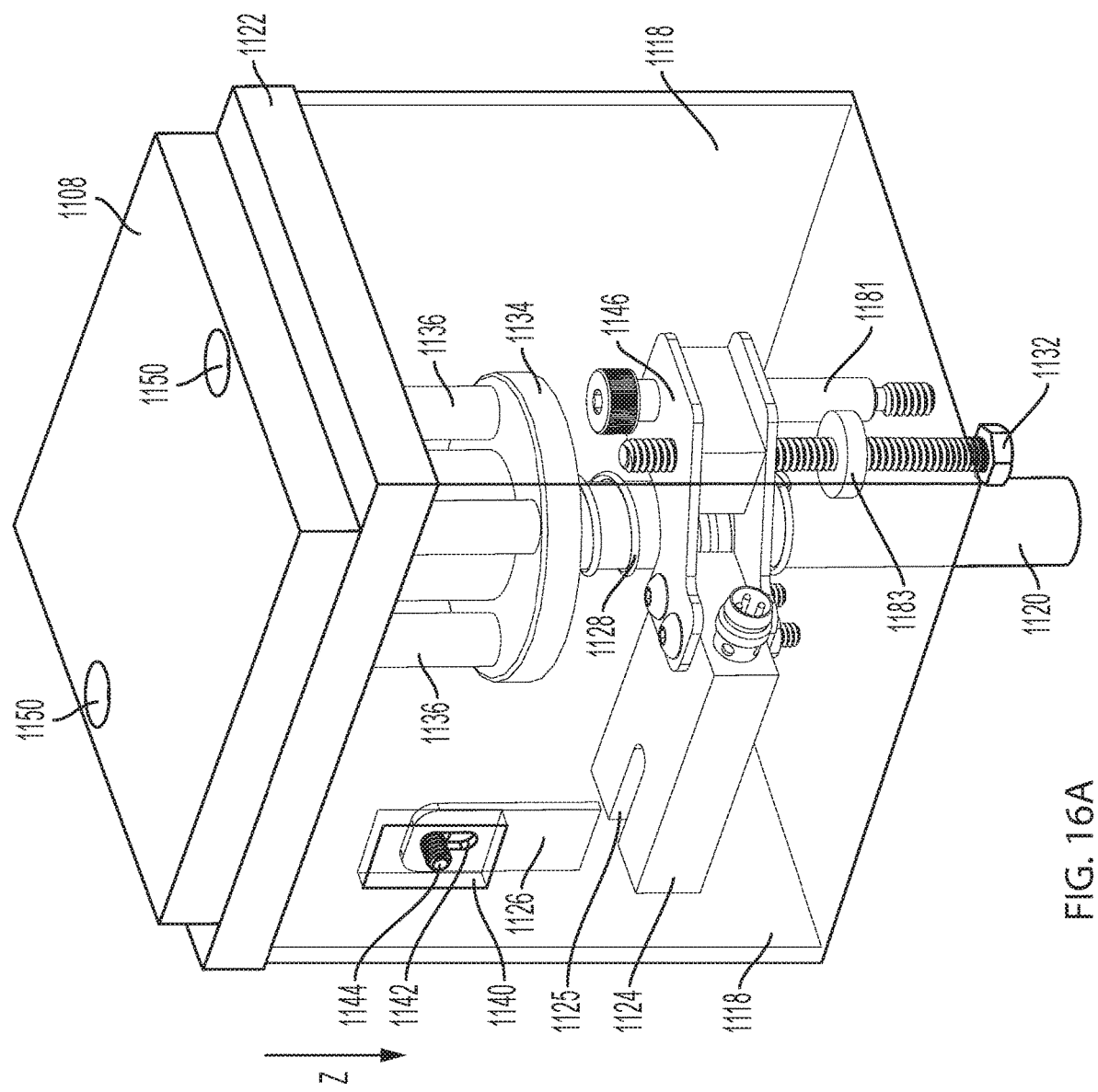
FIG. 16A shows a perspective view of details of a beverage container weighing apparatus in accordance with additional embodiments.

FIG. 16A shows a perspective view of details of a beverage container weighing apparatus in accordance with additional embodiments. In this view, it shows a plurality of (or, or at least one) weigh plate mounting holes 1150 that can be used to secure the weigh plate 1108 to the container platform 1122 via screws or other suitable fasteners. The container platform 1122 is connected to a plurality of platform rods, indicated generally as 1136. The platform rods 1136 are affixed to a linear bearing 1134. The linear bearing 1134 is configured and disposed to compress spring 1128. Spring 1128 is disposed around push rod 1120. The spring 1128 may be supported at the bottom by collar 1117, or other suitable mechanism. As the weight applied to the weigh plate 1108 increases, the lateral walls, indicated generally as 1118, which are also affixed to the container platform 1122, move downward as indicated by arrow Z. As the lateral walls move downward, the flange 1126 traverses slot 1125 of sensor 1124, disrupting an optical beam, causing the sensor 1124 to assert a dispense-stop signal.

The sensor 1124 is attached to sensor bracket 1146 which is movably attached to sensor mount shaft 1181. Shaft 1181 is secured to frame floor 1105 (FIG. 15A). A sensor adjustment bracket 1183 is affixed to the sensor mount shaft 1181. The sensor bracket 1146 is attached to sensor adjustment screw 1132. Turning sensor adjustment screw 1132 adjusts the distance between the sensor 1124 and the flange 1126 to allow fine tuning of the mechanism for a particular type of container, and/or container contents.

Embodiments include an additional adjustment of the beverage container weighing apparatus. In embodiments, a flange fastener 1144 is affixed to the lateral wall 1118. The flange fastener 1144 comprises a flange slot 1142. The flange slot 1142 allows for vertical adjustment for the flange 1126. Thus, in embodiments, there are two adjustments for the triggering of the dispense-stop signal, adjusting the vertical position of flange 1126, and adjusting the vertical position of sensor 1124 via sensor adjustment screw 1132.

Figure 16B:
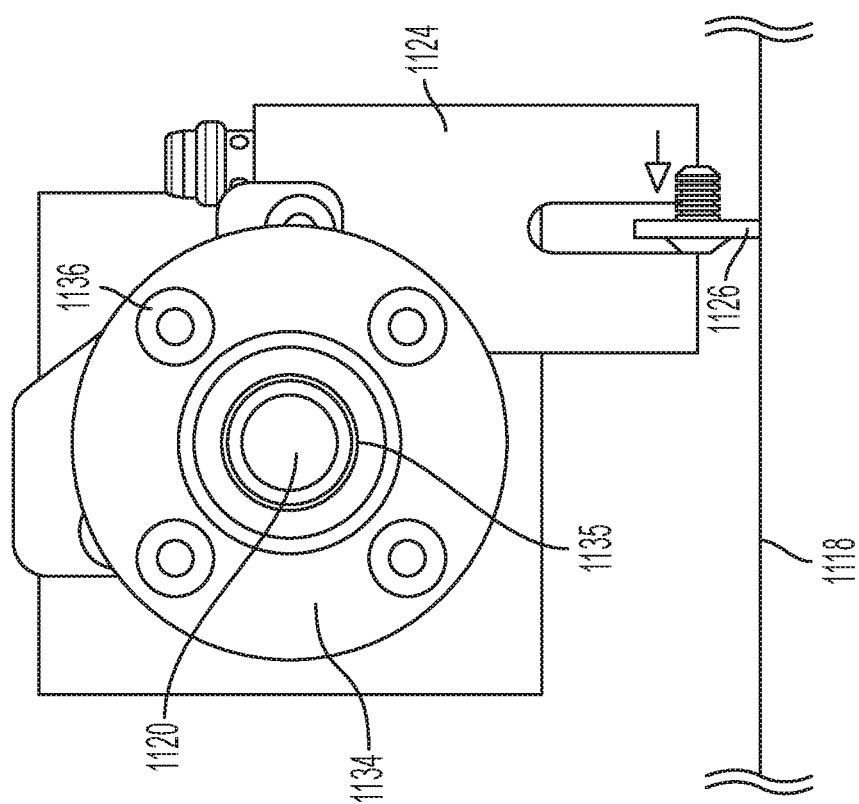
FIG. 16B shows a top-down view of a beverage container weighing apparatus in accordance with additional embodiments with parts removed to reveal the linear bearing.

FIG. 16B shows a top-down view (as viewed from the direction of arrow Z of FIG. 16A) of a beverage container weighing apparatus in accordance with additional embodiments with the weigh plate 1108 and container platform 1122 removed to reveal the linear bearing 1134. As can be seen in this view, linear bearing 1134 includes a circular opening 1135 within it that is sized to allow the push rod 1120 to fit therethrough. Also in this view, it can be seen that the flange 1126 is affixed to a lateral wall 1118 and configured and disposed to trip the sensor 1124 by traversing the slot 1125 of sensor 1124. The platform rods, indicated generally as 136, are affixed to the linear bearing 1134 and engage with the container platform 1122 (see FIG. 15A).

Figure 17B:
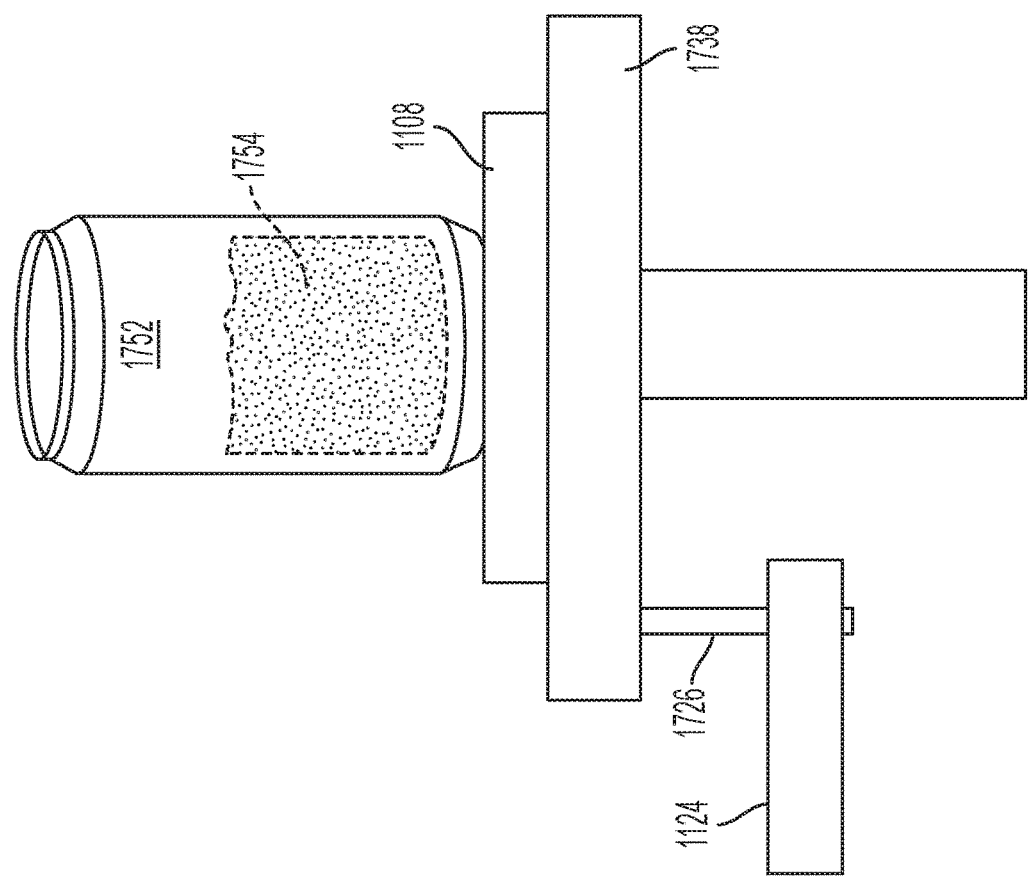
FIG. 17B shows a side view of details of a beverage container weighing apparatus in accordance with additional embodiments utilizing an optical sensor in a dispensing-complete configuration.
Figure 17C:
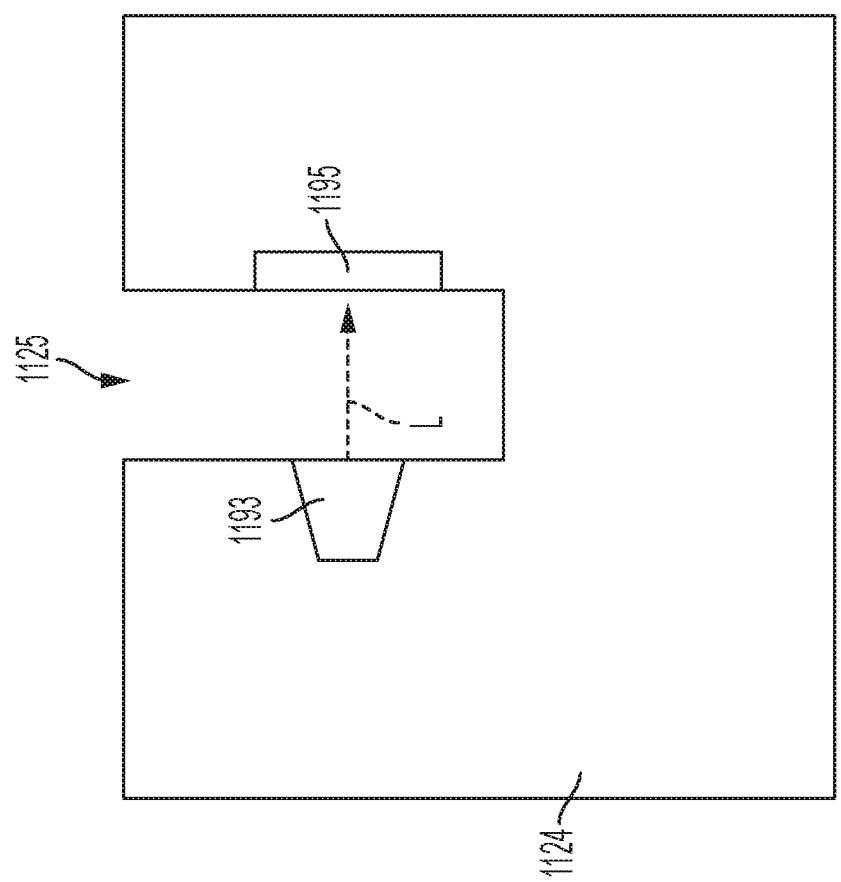
FIG. 17C shows a top-down view of the sensor of FIG. 17B.

FIG. 17A shows a side view of details of a beverage container weighing apparatus in accordance with additional embodiments utilizing optical sensor 1124. In this view, it is shown that the weigh plate 1108 has a width W1, and the container platform 1738 to which it is attached has a width W2, where W2 is greater than W1. This relationship between W2 and W1 enables the locking mechanism of the beverage container weighing apparatuses of disclosed embodiments. In this embodiment, a flange 1726 is mounted directly to the container platform 1738. Referring now to FIG. 17B, it shows a side view of details of a beverage container weighing apparatus in accordance with additional embodiments utilizing an optical sensor in a dispensing-complete configuration. In this configuration, a beverage container 1752 with a desired amount of contents 1754 causes the lowering of the weigh plate 1108, and corresponding container platform 1738. This causes flange 1726 to traverse sensor 1124, causing an assertion of a dispense-stop signal that is received by processor 802 via input/output interface 812 (FIG. 8). In embodiments, the sensor comprises an optical sensor. FIG. 17C shows a top-down view of the sensor 1124 of FIG. 17B. In this view a slot 1125 is visible. Optical emitter 1193 is disposed on one side of the slot 1125. Optical receiver 1195 is disposed on an opposite side of the slot, opposite the optical emitter 1193. The optical emitter 1193 emits light beam L, which is received by optical receiver 1195. When the light beam L is interrupted, the sensor 1124 asserts a signal, which may be utilized to indicate a dispense-stop condition.

Figure 18A:
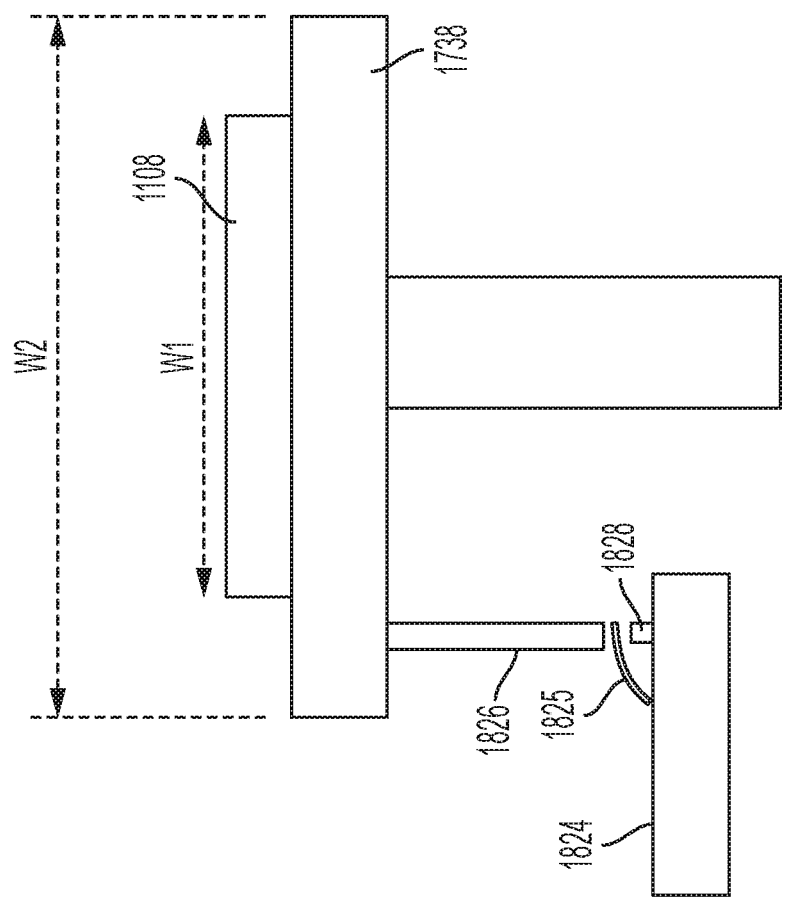
FIG. 18A shows a side view of details of a beverage container weighing apparatus in accordance with additional embodiments utilizing a contact sensor.
Figure 18B:
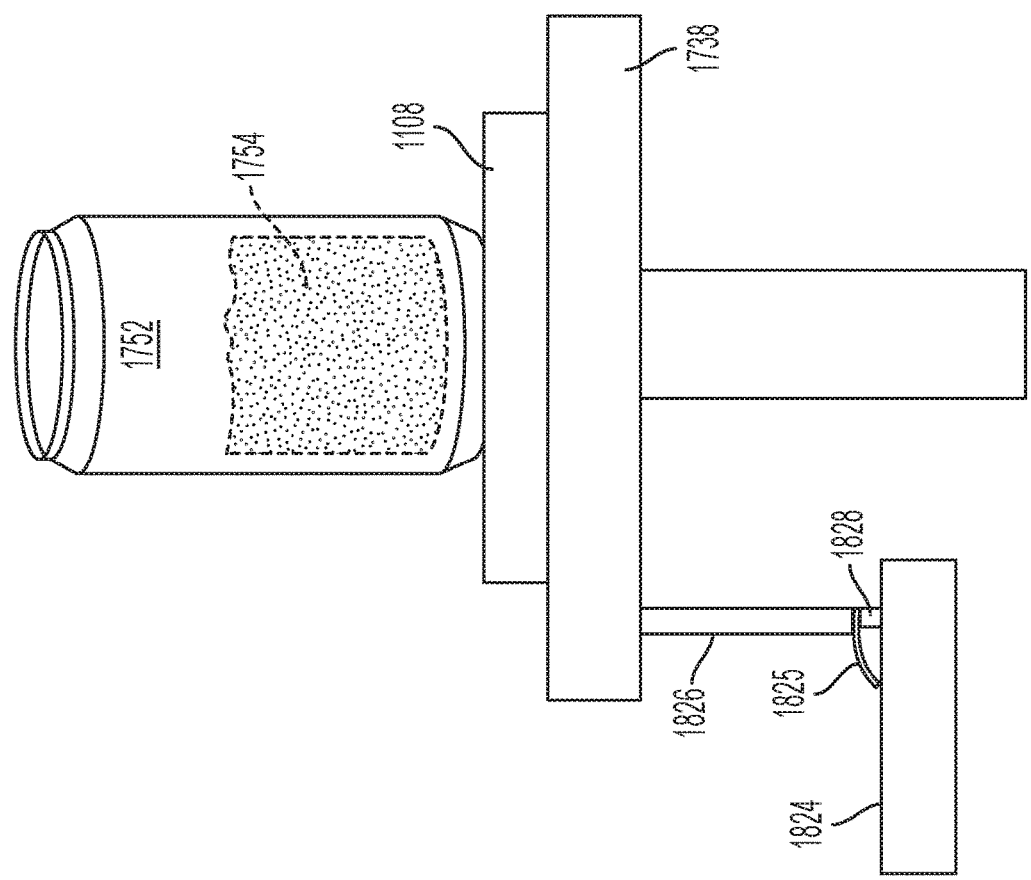
FIG. 18B shows a side view of details of a beverage container weighing apparatus in accordance with additional embodiments utilizing a contact sensor in a dispensing-complete configuration.

FIG. 18A shows a side view of details of a beverage container weighing apparatus in accordance with additional embodiments utilizing a contact sensor 1824. Contact sensor 1824 includes a bendable conductive element 1825 such as a metallic strip. Contact sensor 1824 further includes a conductive terminal block 1828. In embodiments, the conductive element 1825 and terminal block 1828 are comprised of a conductive material such as copper, brass, aluminum, and/or other suitable conductive material. In this view, it is shown that the weigh plate 1108 has a width W1, and the container platform 1738 to which it is attached has a width W2, where W2 is greater than W1. This relationship between W2 and W1 enables the locking mechanism of the beverage container weighing apparatuses of disclosed embodiments. In this embodiment, a flange 1826 is mounted directly to the container platform 1738. Referring now to FIG. 18B, it shows a side view of details of a beverage container weighing apparatus in accordance with additional embodiments utilizing an optical sensor in a dispensing-complete configuration. In this configuration, a beverage container 1752 with a desired amount of contents 1754 causes the lowering of the weigh plate 1108, and corresponding container platform 1738. This causes flange 1826 to push conductive element 1825 to contact terminal block 1828, completing an electrical circuit, thereby causing an assertion of a dispense-stop signal that is received by processor 802 via input/output interface 812 (FIG. 8). In embodiments, flange 1826 is comprised of a non-conductive material such as plastic, polycarbonate, or other suitable material. In embodiments, the sensor comprises a contact sensor.

Figure 19A:
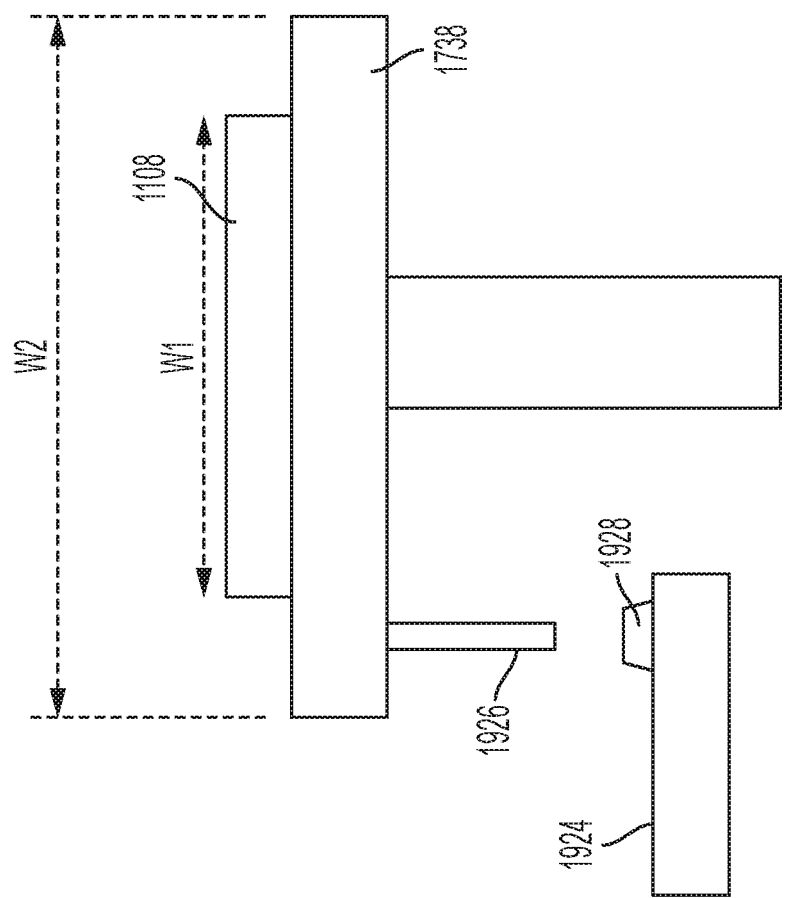
FIG. 19A shows a side view of details of a beverage container weighing apparatus in accordance with additional embodiments utilizing a proximity sensor.
Figure 19B:
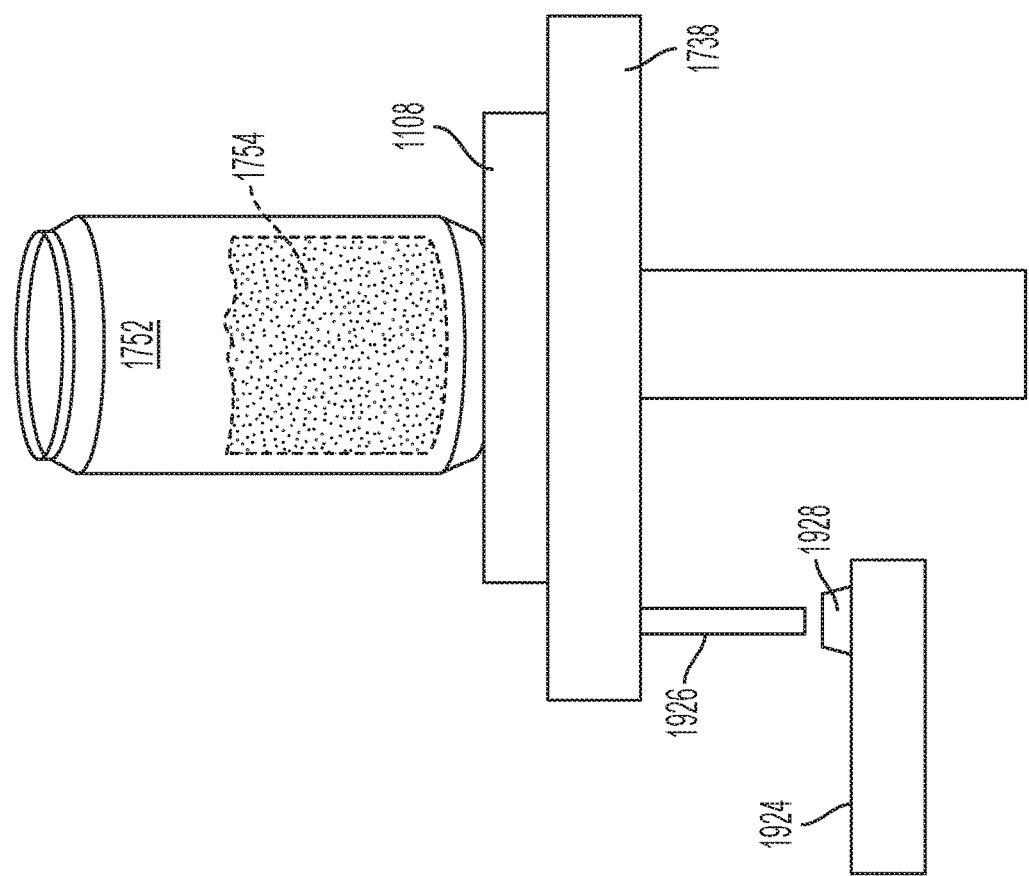
FIG. 19B shows a side view of details of a beverage container weighing apparatus in accordance with additional embodiments utilizing a proximity sensor in a dispensing-complete configuration.

FIG. 19A shows a side view of details of a beverage container weighing apparatus in accordance with additional embodiments utilizing a proximity sensor 1924. Proximity sensor 1924 includes a magnetic field detector 1928. When the flange 1926 is in within a predetermined distance, it causes the proximity sensor 1924 to assert a dispense-stop signal. In this view, it is shown that the weigh plate 1108 has a width W1, and the container platform 1738 to which it is attached has a width W2, where W2 is greater than W1. This relationship between W2 and W1 enables the locking mechanism of the beverage container weighing apparatuses of disclosed embodiments. Referring now to FIG. 19B, it shows a side view of details of a beverage container weighing apparatus in accordance with additional embodiments utilizing an optical sensor in a dispensing-complete configuration. In this configuration, a beverage container 1752 with a desired amount of contents 1754 causes the lowering of the weigh plate 1108, and corresponding container platform 1738. This causes flange 1926 to be within a predetermined distance from magnetic field detector 1928, causing an assertion of a dispense-stop signal that is received by processor 802 via input/output interface 812 (FIG. 8). In embodiments, the sensor comprises a proximity sensor.

FIG. 20A shows a top-down view of a weigh plate 2400 in accordance with embodiments of the present invention. In this view, the top surface 2401 of the weigh plate 2400 is shown. Additionally, the weigh plate mounting holes 2450 are shown (similar to 1150 of FIG. 16A). Note that while two mounting holes are shown, other embodiments may utilize more or fewer mounting holes.

FIG. 20B shows a side view of weigh plate 2400, indicating the mounting holes 2450 and underside cavity 2460. FIG. 20C shows a bottom-up view of weigh plate 2400, indicating the mounting holes 2450 and underside cavity 2460. The cavity 2460 can be used to hold a weight that may be affixed to the underside of the weigh plate in the cavity 2460 via adhesive or other suitable mechanism. The weight is selected such that when a desired beverage container is filled with a desired amount of a specific type of contents, the weigh plate is sufficiently weighted to cause the corresponding sensor (e.g. 1124 of FIG. 16A) to assert a dispense-stop signal. This signal may be received by processor 802 via input/output interface 812 (FIG. 8) to cause the stopping of dispensing. In some embodiments, there can be multiple weigh plates, with differing weights, depending on the production details. For example, a first batch of product may be dispensed into 12-ounce containers, whereas a second batch of product may be dispensed into 16-ounce containers. When switching from the 12-ounce production run to the 16-ounce production run, an operator can swap out the weigh plates, replacing heavier weigh plates with lighter weigh plates for the larger container size. The lighter weigh plate is used with 16-ounce containers since the contents of the containers weigh more than the contents of the 12-ounce containers. The different weigh plates compensate for the differences in container sizes, content density, and/or desired content fill level. In embodiments, the weigh plate is comprised of plastic. Embodiments may include multiple weigh plates. Embodiments may include a first weigh plate and a second weigh plate. In embodiments, a top surface of the first weigh plate and the top surface of the second weigh plate have an equivalent surface area. In embodiments, a top surface of the first weigh plate and the top surface of the second weigh plate have equivalent dimensions. In embodiments, the first weigh plate weighs more than the second weigh plate.

Figure 21:
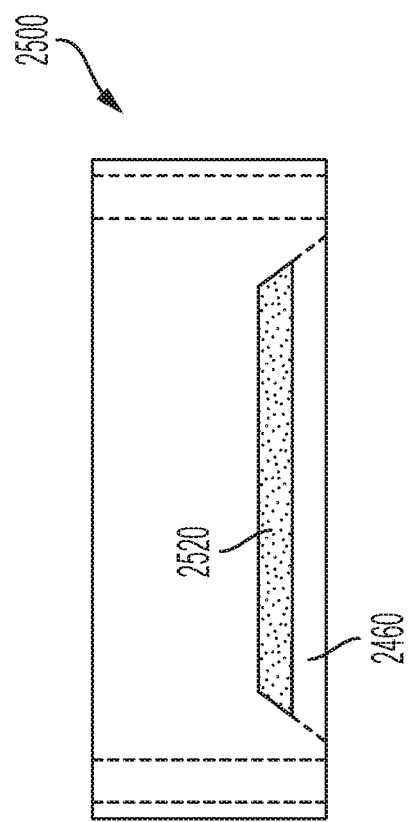
FIG. 21 shows an exemplary weigh plate for a large beverage container.

FIG. 21 shows an exemplary weigh plate 2500 for a large beverage container. Weigh plate 2500 has weight 2520 affixed within cavity 2460. Weight 2520 may be comprised of steel, aluminum, or other suitable material.

Figure 22:
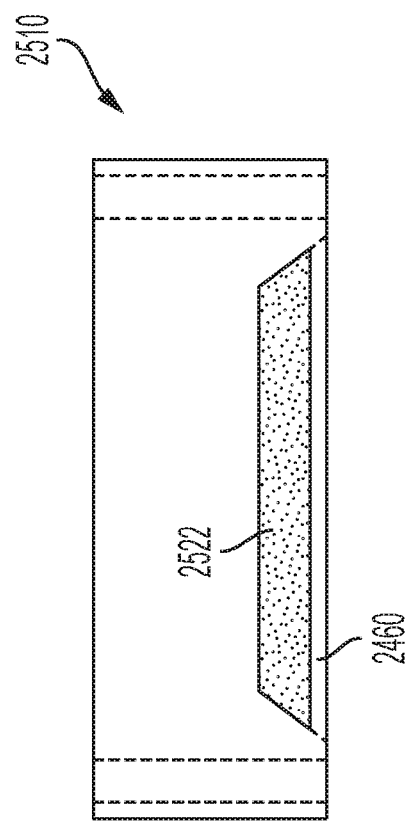
FIG. 22 shows an exemplary weigh plate for a small beverage container.

FIG. 22 shows an exemplary weigh plate 2510 for a small beverage container. Weigh plate 2510 has weight 2522 affixed within cavity 2460. Weight 2522 may be comprised of steel, aluminum, or other suitable material. Weigh plate 2510 is heavier than weigh plate 2500 of FIG. 21. Thus, weigh plate 2510 is suitable for smaller beverage containers than weigh plate 2500 of FIG. 21. In embodiments, the weigh plate comprises a recessed underside, and a weight is disposed within the recessed underside, such as shown in FIG. 22.

Figure 23:
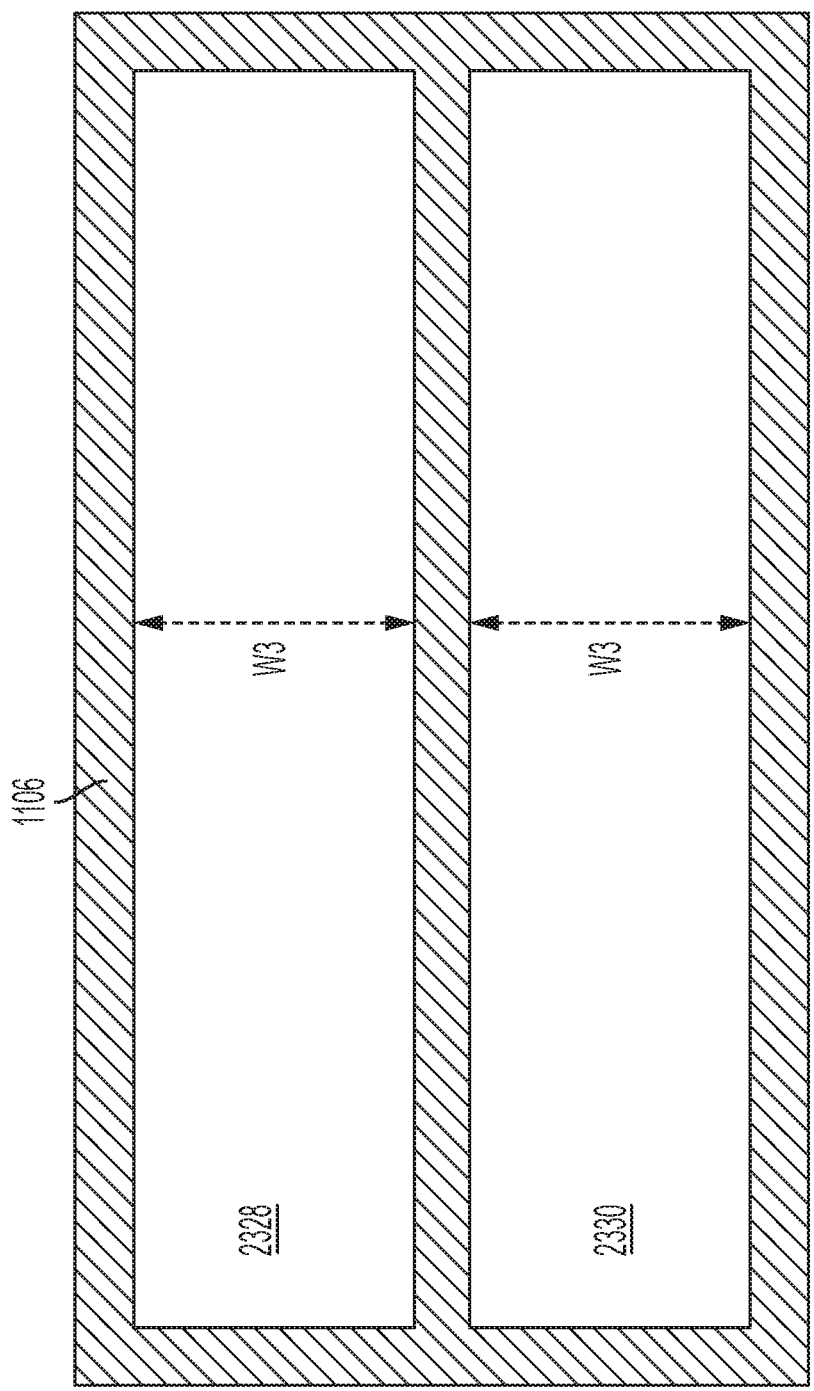
FIG. 23 shows a top-down view of a stop plate in accordance with embodiments of the present invention.

FIG. 23 shows a top-down view of a stop plate 1106 in accordance with embodiments of the present invention. The stop plate 1106 comprises opening 2328 and opening 2330. These openings have a width W3, where W3 is less than W2 as shown in FIG. 17A, and where W3 is greater than W1 as shown in FIG. 17A. Thus, the openings in the stop plate 1106 serve to stop the container platforms 1122, while allowing the smaller weigh plates 1108 to traverse the opening.

FIG. 24A shows a side view of details of a weigh plate locked against the stop plate in accordance with embodiments of the present invention. In this view it can be seen that the push rod 1120 is in contact with the container platform 1122. Force exerted by the connected actuators (e.g. 1102 of FIG. 14B) forces the container platform 1122 against the stop plate 1106. The spring 1128 is disposed around the push rod 1120 and the spring 1128 may be supported at the bottom by collar 1117, or other suitable mechanism.

During use in a beverage container filling operation, a transport mechanism moves empty containers onto the weigh plates. Once the empty containers are in place, the actuators 1102 retract. The weigh plate stays in place with the actuators retracted due to the force exerted by spring 1128.

Due to the relationship that W2 (container platform width) is greater than W3 (stop plate opening), and W3 (stop plate opening) is greater than W1 (weigh plate width), the container platform 1122 stops against stop plate 1106 when pushed by the push rod 1120. The weigh plate 1108 is able to traverse the opening in the stop plate since its width W1 is less than W3.

Figure 24B:
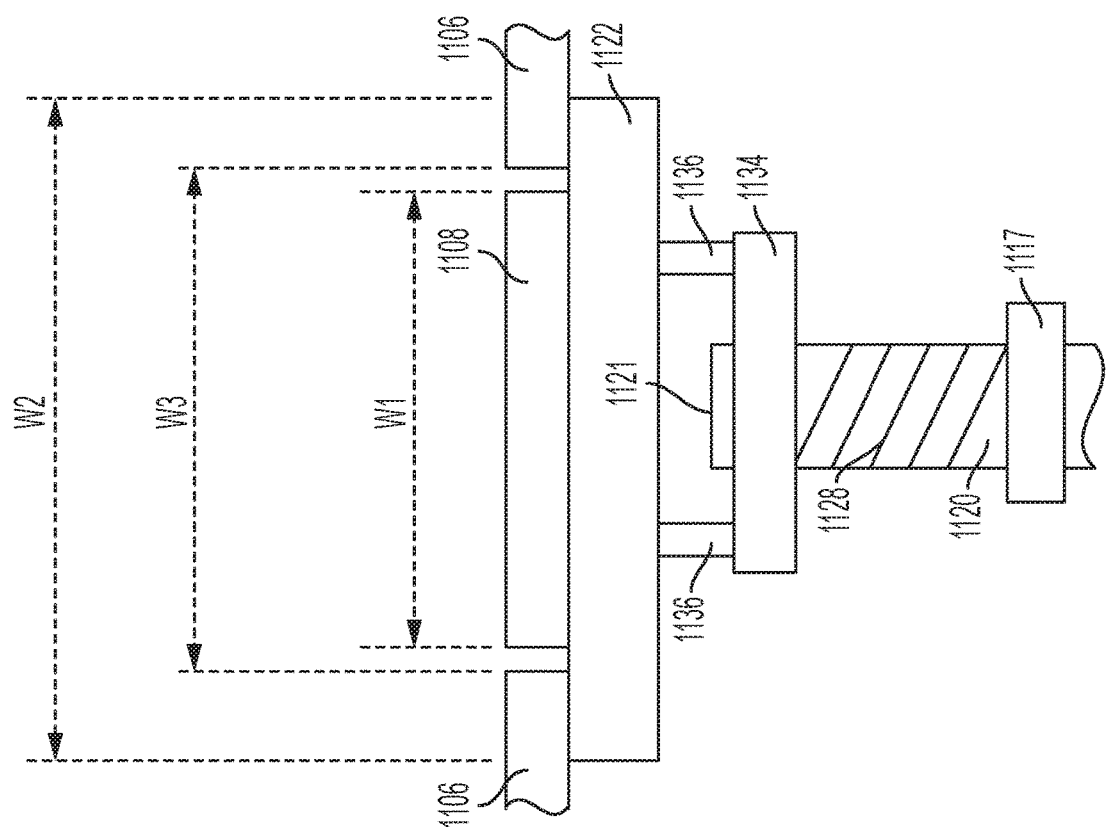
FIG. 24B shows a side view of details of a weigh plate unlocked in accordance with embodiments of the present invention.

FIG. 24B shows a side view of details of a weigh plate unlocked in accordance with embodiments of the present invention. In this configuration, the push rod 1120 is retracted such that the top surface 1121 is separated from (no longer in contact with) the container platform 1122. Then, as a beverage container is filled, the weigh plate exerts force on container platform 1122, which is mechanically coupled to linear bearing 1134 via a plurality of platform rods 1136. The linear bearing 1134 compresses the spring 1128 until the sensor (e.g. 1124 of FIG. 16A) is tripped to indicate a dispense-stop condition.

As can now be appreciated, disclosed embodiments provide improvement in liquid product dispensing. Beverage cans are filled based on weight, rather than time, flow rate or fill sensor (conductivity). The fill rate is thus decoupled from the determination of the full condition. This can enable improved accuracy, resulting in less product discarding, thereby improving product yield, and thusly, improving profit margins for a beverage manufacturing operation. Although the aforementioned examples utilize cans, some embodiments may work with jars, bottles, and/or other suitable containers. Furthermore, while some embodiments may be used for liquid beverages such as beer, other embodiments may be used for powders, slurries, or other suitable products.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, and/or elements.

Although embodiments of the invention have been described herein as systems and method, in some embodiments, the invention may include a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the invention has been particularly shown and described in conjunction with exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the invention.

What is claimed is:

1. A beverage container weighing apparatus, comprising:
   a container platform;
   a weigh plate disposed on the container platform;
   a compression spring mechanically coupled to the container platform;
   a stop plate, wherein the stop plate comprises an opening, wherein the opening is wider than the weigh plate, and wherein the container platform is wider than the opening;
   a weigh plate lockdown actuator configured and disposed to secure the weigh plate against the stop plate; and
   a sensor configured and disposed to generate a trigger event in response to a predetermined weight being loaded on the weigh plate.

2. The beverage container weighing apparatus of claim 1, wherein the sensor comprises a contact sensor.

3. The beverage container weighing apparatus of claim 1, wherein the sensor comprises a proximity sensor.

4. The beverage container weighing apparatus of claim 1, wherein the weigh plate lockdown actuator comprises a pneumatic actuator.

5. The beverage container weighing apparatus of claim 1, wherein the weigh plate lockdown actuator comprises an electromechanical actuator.

6. The beverage container weighing apparatus of claim 1, further comprising a controller configured and disposed to control a liquid product dispensing system, the controller comprising:
   a processor;
   an input/output interface coupled to the processor;
   a memory coupled to the processor, wherein the memory contains instructions, that when executed by the processor, perform steps including:
   activating the weigh plate lockdown actuator;
   operating a transport mechanism to place a can on the weigh plate;
   deactivating the weigh plate lockdown actuator;
   starting product dispensing;
   in response to detecting a full condition via the input/output interface, ending product dispensing;
   reactivating the weigh plate lockdown actuator; and
   operating the transport mechanism to remove the can from the weigh plate.

7. The beverage container weighing apparatus of claim 1, wherein the weigh plate is comprised of plastic.

8. The beverage container weighing apparatus of claim 1, wherein the weigh plate comprises a recessed underside, and wherein a weight is disposed within the recessed underside.

9. The beverage container weighing apparatus of claim 1, wherein the sensor comprises an optical sensor.

10. The beverage container weighing apparatus of claim 9, further comprising:
    a lateral wall disposed perpendicular to the container platform;
    a flange attached to an interior surface of the lateral wall, wherein the flange is configured and disposed to trigger the optical sensor when a predetermined mass is placed on the weigh plate.

11. A beverage container weighing apparatus, comprising:
    a container platform;
    a weigh plate disposed on the container platform;
    a compression spring mechanically coupled to the container platform;
    a stop plate, wherein the stop plate comprises an opening, wherein the opening is wider than the weigh plate, and wherein the container platform is wider than the opening;
    a weigh plate lockdown actuator configured and disposed to secure the weigh plate against the stop plate; and
    a flange attached to an underside surface of the container platform, wherein the flange is configured and disposed to trigger an optical sensor when a predetermined mass is placed on the weigh plate.

12. The beverage container weighing apparatus of claim 11, wherein the weigh plate lockdown actuator comprises a pneumatic actuator.

13. The beverage container weighing apparatus of claim 11, wherein the weigh plate lockdown actuator comprises an electromechanical actuator.

14. A beverage container weighing apparatus, comprising:
    a first container platform;
    a first weigh plate disposed on the first container platform, wherein the first weigh plate comprises a recessed underside, and wherein a first weight is disposed within the recessed underside of the first weigh plate;
    a second container platform;
    a second weigh plate disposed on the second container platform, wherein the second weigh plate comprises a recessed underside, and wherein a second weight is disposed within the recessed underside of the second weigh plate;
    a first compression spring mechanically coupled to the first container platform;
    a second compression spring mechanically coupled to the second container platform;
    a stop plate, wherein the stop plate comprises an opening, wherein the opening is wider than the first weigh plate and wherein the opening is wider than the second weigh plate, and wherein the first container platform is wider than the opening, and wherein the second container platform is wider than the opening;

a weigh plate lockdown actuator configured and disposed to secure the first weigh plate and second weigh plate against the stop plate;

a first sensor configured and disposed to generate a trigger event in response to a first predetermined weight being loaded on the first weigh plate; and a second sensor configured and disposed to generate a trigger event in response to a second predetermined weight being loaded on the second weigh plate.

15. The beverage container weighing apparatus of claim 14, wherein the first sensor comprises a contact sensor.

16. The beverage container weighing apparatus of claim 14, wherein the first sensor comprises a proximity sensor.

17. The beverage container weighing apparatus of claim 14, wherein the first sensor comprises an optical sensor.

18. The beverage container weighing apparatus of claim 14, wherein a top surface of the first weigh plate and the top surface of the second weigh plate have an equivalent surface area.

19. The beverage container weighing apparatus of claim 14, wherein a top surface of the first weigh plate and the top surface of the second weigh plate have equivalent dimensions.

20. The beverage container weighing apparatus of claim 19, wherein the first weigh plate weighs more than the second weigh plate.

21. A beverage container weighing apparatus, comprising:
a container platform;
a weigh plate disposed on the container platform;
a compression spring mechanically coupled to the container platform;
a stop plate, wherein the stop plate comprises an opening, wherein the opening is wider than the weigh plate, and wherein the container platform is wider than the opening;
a weigh plate lockdown actuator operable to press the weigh plate against the stop plate;
a processor;
an input/output interface coupled to the processor;
an optical sensor coupled to an input/output interface;
a memory coupled to the processor, wherein the memory contains instructions, that when executed by the processor, perform steps including:
activating the weigh plate lockdown actuator;
operating a transport mechanism to place a can on the weigh plate;
deactivating the weigh plate lockdown actuator;
starting product dispensing;
in response to detecting a full condition from the optical sensor, ending product dispensing;
reactivating the weigh plate lockdown actuator; and
operating the transport mechanism to remove the can from the weigh plate.

\* \* \* \* \*